US006826568B2

(12) United States Patent
Bernstein et al.

(10) Patent No.: US 6,826,568 B2
(45) Date of Patent: Nov. 30, 2004

(54) METHODS AND SYSTEM FOR MODEL MATCHING

(75) Inventors: Philip A. Bernstein, Bellevue, WA (US); Jayant Madhavan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 509 days.

(21) Appl. No.: 10/028,912

(22) Filed: Dec. 20, 2001

(65) Prior Publication Data

US 2003/0120651 A1 Jun. 26, 2003

(51) Int. Cl.[7] .......................... G06F 17/30; G06F 17/00
(52) U.S. Cl. .......................................... 707/6; 707/101
(58) Field of Search .............................. 707/1, 6, 100, 707/101, 104.1, 102; 704/1; 706/20

(56) References Cited

U.S. PATENT DOCUMENTS 6,397,166 B1 * 5/2002 Leung et al. ................ 702/179

OTHER PUBLICATIONS

Andric, M. et al., "Extracting The Data Model from an Existing Database Schema," *Proceedings of the 15th IASTED Int'l Conf. Applied Informatics*, Innsbruck, Austria, Feb. 18–20, 1997, 177–180.

Bergamaschi, S. et al., "Semantic Integration of Semistructured and Structured Data Sources," *SIGMOD Record*, 1999, 28(1), 54–59.

Bernstein, P. et al., "A Vision for Management of Complex Models," *SIGMOD Record*, 2000, 29(4), 55–63.

Castano, S. et al., "A Schema Analysis and Reconciliation Tool Environment for Heterogeneous Databases," *Proceedings: IDEAS'99 International Database Engineering and Applications Symposium*, Montreal, Canada, Aug. 2–4, 1999.

Chun, H.W. et al., "A Massively Parallel Model of Schema Selection," *IEEE First International Conference on Neural Networks*, San Diego, California, Jun. 21–24, 1987, II–379–386.

Clifton, C. et al., "Experience with a Combined Approach to Attribute–Matching Across Heterogeneous Databases," *Data Mining and Reverse Engineering: Searching for Semantics*, Leysin, Switzerland, Oct. 7–10, 1997, Ch. 18, 428–451.

Doan, A. et al., "Reconciling Schemas of Disparate Data Sources: A Machine–Learning Approach," *Proceedings of the 2001 ACM SIGMOD, International Conference on Management of Data*, Santa Barbara, California, May 21–24, 2001, 509–520.

(List continued on next page.)

Primary Examiner—Uyen Le
(74) Attorney, Agent, or Firm—Woodcock Washburn LLP

(57) ABSTRACT

Systems and methods for automatically and generically matching models are provided, such as may be provided in a matching application or matching component, or provided in a general purpose system for managing models. The methods are generic since the methods apply to hierarchical data sets outside of any particular data model or application. Similarity coefficients are calculated for, and mappings are discovered between, schema elements based on their names, data types, constraints, and schema structure, using a broad set of techniques. Some of these techniques include the integrated use of linguistic and structural matching, context dependent matching of shared types, and a bias toward subtree, or leaf, structure where much of the schema content resides.

47 Claims, 15 Drawing Sheets

OTHER PUBLICATIONS

Etzion, O., "Active Interdatabase Dependencies," *Information Sciences*, 1993, 75(N1–2), 133–163 (Corporate source reprint provided, pp. 1–28).

Li, W–S et al., "SEMINT: A tool for identifying attribute correspondences in heterogeneous databases using neural networks," *Data & Knowledge Eng.*, 2000, 33, 49–84.

Li, L. et al., "Study of Knowledge Representation Based on Constrained Object," *J. of University of Electr. Sci. Technol. of China*, 1998, 27(4), 411–415 (English language abstract provided).

Madhavan, J. et al., "Generic Schema Matching with Cupid," *Proceedings of the 27th Very Large Databases Conference*, Roma, Italy, 2001, 10 pages.

Miller, R.J. et al., "Schema Mapping as Query Discovery," *Proceeding of the 26th Very Large Databases Conference*, Cairo, Egypt, 2000, 77–88.

Milo, T. et al., "Using Schema Matching to Simplify Heterogeneous Data Translation," *International Conference on Very Large Databases*, 1998, 122–133.

Mitra, P. et al., "Semi–automatic Integration of Knowledge Sources," *Fusion*, 1999, 8 pages.

Palopoli, L. et al., "The System DIKE: towards the semi-–automatic synthesis of Cooperative Information Systems and Data Warehouses," *ADBIS*, 2000, 108–117.

Rahm, E. et al., "On Matching Schemas Automatically," *On Matching Schemas Automatically*, 2001, Report Nr.1, 1–27.

Raman, R. et al., "Matchmaking: Distributed Resource Management for High Throughput Computing," *Proceedings: The Seventh International Symposium on High Performance Distributed Computing*, Chicago, Illinois, Jul. 28–31, 1998, 140–146.

Wald, J.A. et al., "Explaining Ambiguity in a Formal Query Language," *ACM Trans. Database System*, 1990, 15(2), 125–161.

Wang, Q.Y. et al., "Approximate Graph Schema Extraction for Semi–structured Data," *Advances in Database Technology—EDBT 2000: 7th International Conference on Extending Database Technology*, Konstanz, Germany, Mar. 27–31, 2000, 302–316.

Castano, S. et al., "Global Viewing of Heterogeneous Data Sources," *IEEE Transactions on Knowledge and Data Engineering*, 2001, 13(2), 277–297 (Corporate source reprint provided, pp. 1–30).

Palopoli, L. et al., "A unified graph–based framework for deriving nominal interscheme properties, type conflicts and object cluster similarities," *IEEE Computer Society Press*, 1999, 12 pages.

* cited by examiner

METHODS AND SYSTEM FOR MODEL MATCHING

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2001, Microsoft Corp.

FIELD OF THE INVENTION

The present invention relates to model or schema matching, or more generally to the matching of separate hierarchical data sets. More particularly, the present invention relates to methods and systems for matching models, or schemas, that discover similarity coefficients between schema elements, including analyses based on one or more of schema names, schema data types, schema constraints and schema structure.

BACKGROUND OF THE INVENTION

Match is a schema manipulation operation that takes two schemas, models or otherwise hierarchically represented data as input and returns a mapping that identifies corresponding elements in the two schemas. Schema matching is a critical step in many applications. For example, in Ebusiness, match helps to map messages between different extensible markup language (XML) formats. In data warehousing, match helps to map data sources into warehouse schemas. In mediators, match helps to identify points of integration between heterogeneous databases. Schema matching thus far has primarily been studied as a piece of other applications. For example, schema integration uses matching to find similar structures in heterogeneous schemas, which are then used as integration points. Data translation uses matching to find simple data transformations. Given the continued evolution and importance of XML and other message mapping, match solutions are similarly likely to become increasingly important in the future.

Schema matching is challenging for many reasons. First and foremost, schemas for identical concepts may have structural and naming differences. In addition, schemas may model similar, but yet slightly different, content. Schemas may be expressed in different data models. Schemas may use similar words that may nonetheless have different meanings, etc.

Given these problems, today, schema matching is done manually by domain experts, sometimes using a graphical tool that can graphically depict a first schema according to its hierarchical structure on one side, and a second schema according to its hierarchical structure on another side. The graphical tool enables a user to select and visually represent a chosen mapping to see how it plays out vis-à-vis the other remaining schema elements. At best, some tools can detect exact matches automatically, although even minor name and structure variations may lead them astray. Despite match being such a pervasive, important and difficult problem, model matching has not yet been studied independently except as it may apply to other more narrow problems, such as those named above, and thus a generic solution for schema matching that can apply to many different data models and application domains remains to be provided. Moreover, such a wide variety of tools would benefit from a matching solution that an independent match component or module that can be incorporated into or downloaded for such tools would be of great utility.

For a more detailed definition, a schema consists of a set of related elements, such as tables, columns, classes, XML elements or attributes, etc. The result of the match operation is a mapping between elements of two schemas. Thus, a mapping consists of a set of mapping elements, each of which indicates that certain elements of schema S1 are related to certain elements of schema S2. For example, as illustrated in FIG. 1, a mapping between purchase order schemas PO and POrder may include a mapping element that relates element Lines.Item.Line of S1 to element Items.Item.ItemNumber of S2, as shown by the dotted line. While a mapping element may have an associated expression that specifies its semantics, mappings are treated herein as nondirectional.

A model or schema is thus a complex structure that describes a design artifact. Examples of models are Structured Query Language (SQL) schemas, XML schemas, Unified Modeling Language (UML) models, interface definitions in a programming language, Web site maps, make scripts, object models, project models or any hierarchically organized data sets. Many uses of models require building mappings between models. For example, a common application is mapping one XML schema to another, to drive the translation of XML messages. Another common application is mapping a SQL schema into an XML schema to facilitate the export of SQL query results in an XML format, or to populate a SQL database with XML data based upon an XML schema. Today, a mapping is usually produced by a human designer, often using a visual modeling tool that can graphically represent the models and mappings. To reduce the effort of the human designer, it would be desirable to provide a tool that at a minimum provides an intelligent initial mapping as a starting point for the designer. Thus, it would be desirable to provide a robust algorithm that automatically creates a mapping between two given models.

Also, there is a related problem of query discovery, which operates on mapping expressions to obtain queries for actual data translation. Both types of discovery are needed. Each is a rich and complex problem that deserves independent study. Query discovery is already recognized as an independent problem, where it is usually assumed that a mapping either is given or is trivial. Herein, the problem of schema matching is analyzed.

It is recognized that the problem of schema matching is inherently subjective. Schemas may not completely capture the semantics of the data they describe, and there may be several plausible mappings between two schemas, making the concept of a single best mapping ill defined. This subjectivity makes it valuable to have user input to guide the match for user validation of the result. This guidance may come via an initial mapping, a dictionary or thesaurus, a library of known mappings, etc. Thus, the goal of schema matching and one not yet adequately achieved by today's algorithms is: Given two input schemas in any data model, optional auxiliary information and an input mapping, compute a mapping between schema elements of the two input schemas that passes user validation.

The following is a taxonomy of currently known matching techniques. Schema matchers can be characterized by the following orthogonal criteria. With respect to schema-based vs. instance-based criteria, schema-based matchers consider only schema information, not instance data. Schema information includes names, descriptions, relationships, constraints, etc. Instance-based matchers either use metadata and statistics collected from data instances to annotate the schema, or directly find correlated schema elements, e.g., using machine learning.

With respect to element vs. structure granularity, an element-level matcher computes a mapping between individual schema elements, e.g., an attribute matcher. A structure-level matcher compares combinations of elements that appear together in a schema, e.g., classes or tables whose attribute sets only match approximately.

With respect to linguistic-based matching, a linguistic matcher uses names of schema elements and other textual descriptions. Name matching involves: putting the name into a canonical form by stemming and tokenization, comparing equality of names, comparing synonyms and hypernyms using generic and domain specific thesauri and matching substrings. Information retrieval (IR) techniques can be used to compare descriptions that annotate some schema elements.

With respect to constraint-based matching, a constraint-based matcher uses schema constraints, such as data types and value ranges, uniqueness, requiredness, cardinalities, etc. A constraint-based matcher might also use intraschema relationships, such as referential integrity.

With respect to matching cardinality, schema matchers differ in the cardinality of the mappings they compute. Some only produce one to one mappings between schema elements. Others produce n to one mappings, e.g., matchings that map the combination of DailyWages and WorkingDays in the source schema to MonthlyPay in the target.

With respect to auxiliary information, schema matchers differ in their use of auxiliary information sources such as dictionaries, thesauri and input match mismatch information. Reusing past match information can also help, for example, to compute a mapping that is the composition of mappings that were performed earlier.

With respect to individual vs. combinational matching, an individual matcher uses a single algorithm to perform the match. Combinational matchers can be one of two types: hybrid matchers and composite matchers. Hybrid matchers use multiple criteria to perform the matching. Composite matchers run independent match algorithms on the two schemas and combine the results.

In light of the above taxonomy, there are a number of known matching algorithms. The SEMINT system is an instance-based matcher that associates attributes in the two schemas with match signatures. The SEMINT system includes 15 constraint-based and 5 content-based criteria derived from instance values and normalized to the [0,1] interval, so that each attribute is a point in 20-dimensional space. Attributes of one schema are clustered with respect to their Euclidean distance. A neural network is trained on the cluster centers and then is used to obtain the most relevant cluster for each attribute of the second schema. SEMINT is a hybrid element-level matcher, but does not utilize schema structure, as the latter cannot be mapped into a numerical value.

The DELTA system groups all available metadata about an attribute into a text string and then applies IR techniques to perform matching. Like SEMINT, the DELTA system does not make much use of schema structure.

The LSD system uses a multilevel learning scheme to perform one to one matching of XML Document Type Definition (DTD) tags. A number of base learners that use different instance-level matching schemes are trained to assign tags of a mediated schema to data instances of a source schema. A metalearner combines the predictions of the base learners. LSD is thus a multi strategy instance-based matcher.

The SKAT prototype implements schema-based matching following a rule-based approach. Rules are formulated in first order logic to express match and mismatch relationships and methods are defined to derive new matches. The SKAT prototype supports name matching and simple structural matches based on isA hierarchies.

The TranScm prototype uses schema matching to drive data translation. The schema is translated to an internal graph representation. Multiple handcrafted matching rules are applied in order at each node. The matching is done top down with the rules at higher level nodes typically requiring the matching of descendants. This top down approach performs well only when the top level structures of the two schemas are quite similar. The TranScm prototype represents an element level and schema-based matcher.

The DIKE system integrates multiple Entity Relationship (ER) schemas by exploiting the principle that the similarity of schema elements depends on the similarity of elements in their vicinity. The relevance of elements is inversely proportional to their distance from the elements being compared, so nearby elements influence a match more than ones farther away. Linguistic matching is based on manual inputs. DIKE is a hybrid schema-based matcher utilizing both element and structure-level information ARTEMIS, the schema integration component of the MOMIS mediator system, matches classes based on their name affinity and structure affinity. MOMIS has a description logic engine to exploit constraints. The classes of the input schemas are clustered to obtain global classes for the mediated schema. Linguistic matching is based on manual inputs using an interface with WordNet. ARTEMIS is a hybrid schema-based matcher utilizing both element and structure-level information.

However, each of the above solutions does not provide an adequate solution to the generic problem of matching schemas. While some of the above solutions may be adequate for a given matching task, due to a design for the particular task, the solution is not a general all purpose approach to model matching. Others were not designed for matching per se, but rather were designed for some other purpose such as schema integration, and thus the techniques applied to matching for these solutions make compromises that do not generalize adequately. Still other existing algorithms are too slow on today's hardware for interactive use, as a result of exhaustive calculations and the like.

There is thus a need for a mechanism or component that provides a complete general purpose schema matching solution. There is further a need for a general solution that considers all of the issues surrounding the above-described taxonomy, and includes a plurality of optimally combined algorithms. There is further a need for a method that automatically generates similarity coefficients for use in mapping two models. There is still further a need for a solution that is as consistent as possible with a given set of similarity relationships between elements of the two models. There are additional needs to be as consistent as possible with key and foreign key definitions in the two models, to relate objects of similar structure, to relate objects that have similar subtree structure and to relate objects that have similar leaf sets. There is also a need for an algorithm that achieves the above needs, but that is also fast enough to be used in real-time, e.g., by an interactive design tool.

SUMMARY OF THE INVENTION

In view of the foregoing, the present invention provides systems and methods for automatically and generically matching models, such as may be provided in a matching application or matching component, or provided in a general purpose system for managing models. The methods are generic since the methods apply to hierarchical data sets outside of any particular data model or application. Similarity coefficients are calculated for, and mappings can be discovered between, schema elements based on their names, data types, constraints, and schema structure, using a broad set of techniques. Some of these techniques include the integrated use of linguistic and structural matching, context dependent matching of shared types, and a bias toward subtree structure where much of the schema content resides.

Other features and embodiments of the present invention are described below.

BRIEF DESCRIPTION OF THE DRAWINGS

The system and methods for model matching are further described with reference to the accompanying drawings in which.

DETAILED DESCRIPTION OF PREFERRED EMBODIMENTS

Overview

Figure 1:
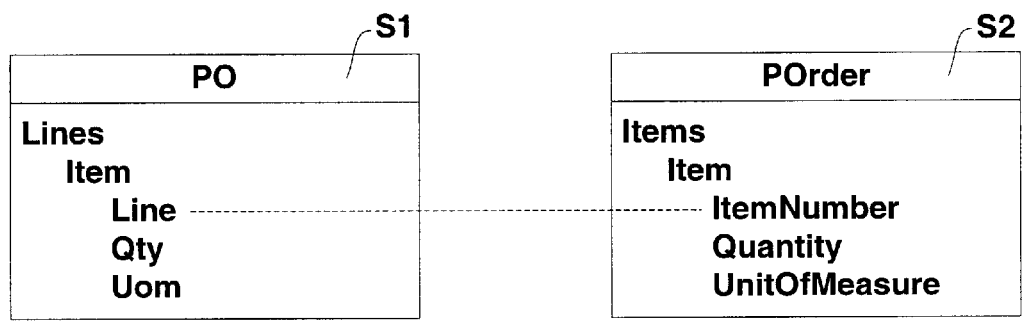
FIG. 1 illustrates two exemplary schemas representing an exemplary matching problem solved in accordance with the present invention.

In accordance with the present invention, methods and systems are provided for automatically creating similarity coefficients between elements of two given schemas or models. A mapping between the models can be produced from the similarity coefficients. For example, the algorithm (s) described by the present invention can automatically create similarity coefficients and a mapping between a SQL schema and an XML schema, although it will be appreciated that the invention is generic and not limited to any particular model type or schema. This is primarily accomplished by computing similarity coefficients between pairs of elements, with a pair of elements including one element from the first schema model and one element from the second schema model.

The model match algorithm of the invention is driven by at least three kinds of information in a data model: linguistic information about the names of model elements, type information about model elements and structural information about how model elements in a model are related. In addition to the models themselves, the algorithm may make use of dictionaries and thesauri to interpret the linguistic information.

The present invention thus provides algorithms for generic schema matching, outside of any particular data model or application, showing that a rich range of techniques is available based upon the taxonomy described above in the background. The invention proposes new algorithm(s) that discover similarity coefficients between schema elements based on their names, data types, constraints, and schema structure, using a broader set of techniques than past approaches. In various embodiments, the invention includes the integrated use of linguistic and structural matching, context dependent matching of shared types, and a bias toward subtree structure where much of the schema content of the subtree's root node resides.

In various non-limiting embodiments, the invention provides a solution to the schema matching problem (1) that includes automatic model matching that is both element-based and structure-based, (2) that utilizes the similarity of the subtrees of the two schemas and that is biased toward similarity of atomic elements, e.g., leaves, of a hierarchical tree, where much content describing the degree of similarity is captured, (3) that exploits internal structure, but is not overly misled by variations in that structure, (4) that exploits keys, referential constraints and views where they exist, (5) that makes context dependent matches of a shared type definition that is used in several larger structures and (6) that generates one to one or one to n mappings, (7) wherein adjustments may be made if desired and wherein a user may make input or correction to the process.

While the invention shares some general approaches with known algorithms, the invention does not implement any particular one of the algorithms themselves. For instance, while aspects of the overall techniques of the invention include a rating match quality in the [0,1] interval and a clustering of similar terms (SEMINT) as well as matching structures based on a local vicinity (DIKE, ARTEMIS), none of the prior art techniques generate similarity coefficients for each node pair of two models being matched based upon both linguistic and structural similarity, wherein similarities associated with the subtree of a root node are updated in accordance with the similarity coefficient calculations for the root node. Other novel aspects of the invention are described in more detail below.

The invention is schema-based and not instance-based and assumes some hierarchy to the schemas being matched. In this regard, the interconnected elements of a schema hierarchy are modeled as a tree structure having branches and leaves. A simple relational schema is an example of a schema tree since such a schema contains tables, which contain columns. An XML schema with no shared elements is another simple example. With such an XML schema, elements include subelements, which in turn include other subelements or attributes. The model may also be enriched to capture additional semantics, making the invention apply as generically as possible, as described in the below section on modeling and the generic object model.

The present invention provides systems and methods that are consistent with a given set of similarity relationships between elements of the two models. For example, the given similarity relationships may include that "PO" is similar to "purchase order" with weight 0.8 and that "PO" is similar to "post office" with weight 0.7. So, an element of one model named "PO" is more similar to a node in the other model named "purchase order" than one named "post office." Therefore, if model1 contains an element named "PO" and model2 contains two elements named "purchase order" and "post office," then all else being equal, "purchase order" is a better match for "PO" than "post office."

The present invention further provides systems and methods that are consistent with key and foreign key definitions, if any, in the two models. For example, when matching two relational schemas, if a column C1 is a key of a table T1 in model1, then it is desirable to map C1 to a column C2 that is a key of its table T2 in model2.

The present invention further provides systems and methods that relate objects of similar structure. For example, if an object $m_1$ of model1 is mapped to an object $m_2$ of model2, then the objects in $m_1$'s neighborhood are mapped to the objects in $m_2$'s neighborhood and those neighborhoods are assigned a similar structural relationship to reflect the similarity of object $m_1$ to object $m_2$.

The present invention further provides systems and methods that relate objects that have similar leaf sets. For example, if the leaf elements under InvoiceInfo in one model are more similar to those under BillingInfo than to those under EmployeeInfo, then it is better to map InvoiceInfo to BillingInfo than to EmployeeInfo.

Lastly, the algorithm(s) of the present invention are fast, i.e., the algorithm(s) are fast enough, for example, to be used by an interactive design tool or other real-time application.

The invention recognizes that two nodes are similar if (1) the model elements corresponding to the two nodes are inherently similar, such as if the model elements are linguistically similar, and if (2) the subtrees rooted at the two nodes are similar. The invention also recognizes that the similarity of two subtrees is not always reflected by the similarity of their immediate children. The leaves of the subtree give a better estimate of the data described by the subtree, since they refer to the atomic data elements that the model is ultimately describing, and since intervening structure may be superfluous. The invention further recognizes that the similarity of two leaves in hierarchical tree structures depends on their similarity and the similarity of their structural vicinity.

The matching algorithm of the invention works generally as follows. The structural similarity of each pair of leaf nodes s and t in the source (domain) model and target (range) model, respectively, are initialized. For example, the structural similarity may be initialized to the compatibility of the nodes' corresponding data-types. Then, the nodes of the two trees are enumerated in inverse topological order, such as post-order. For each node pair (s,t) encountered during traversal of the two trees, a weighted similarity calculation is made that takes both inherent and structural similarity of the node pair into account. Inherent similarity takes into account only the individual nodes being compared and may be, for example, their linguistic similarity. Structural similarity takes into account the similarity of the subtrees of the node pair, e.g., the leaf sets of the node pair may be considered. The weighted similarity calculation for the node pair (s, t) may then be utilized in connection with either increasing or decreasing the similarity of the subtrees of the node pairs. This reflects that if the nodes are similar, likely the children or leaves rooted by the nodes will be similar as well and by the same token, that if the nodes are dissimilar, then it is likely that the children or leaves of the nodes will be dissimilar. The weight for computing a weighted mean and various thresholds may be set as tuning parameters.

The structural similarity of the two subtrees is determined based on the best matches between corresponding subtrees, e.g., leaf nodes. A good computation for the structural similarity of a node pair (s, t) returns a high value when the number of strong matches of $subtree_s$ and $subtree_t$ is above a certain threshold, such as half, and a low value otherwise.

The similarity computations of the invention thus have a mutually recursive flavor. Two elements are similar if their subtree node sets are similar. The similarity of the subtree nodes is increased if they have ancestors that are similar. The similarity of intermediate substructure also influences subtree similarity: if the subtree structures of two elements are highly similar, then multiple element pairs in the subtrees will be highly similar, which leads to higher structural similarity of the leaves (due to multiple similarity increases). Inverse topological order traversal of the schemas ensures that before two elements e1 and e2 are compared, all the elements in their subtrees have already been compared. This ensures that e1's leaves and e2's leaves capture the similarity of e1's intermediate subtree structure and e2's intermediate subtree structure before e1 and e2 are compared. The structural similarity of two nodes with a large difference in the number of leaves is unlikely to be very good. Such comparisons lead to a large number of element similarities that are below a threshold. This can be prevented by the algorithm(s) of the invention by only comparing elements that have a similar number of leaves in their subtrees, e.g., within a factor of 2. In addition to only comparing relevant elements, such a pruning step decreases the number of element pairs for comparison, and thus speeds operation of the algorithm(s).

The invention thus matches models in a bottom-up fashion, making it rather different from top-down approaches. The disadvantage of a top-down technique is that it depends very heavily on a good matching at the top level of the schema hierarchy. The results will not be good if the children of the roots of the two models are very different, but merely present a different normalization of the same schema. However, a top-down approach may be more efficient when the schemas are very similar. The bottom-up approach of the invention is more conservative and does not suffer from the case of false-negatives, but at the cost of more computation; nonetheless, the performance of the invention in real-time minimizes the impact of this cost.

Various levels of subtree may be considered in accordance with the invention. Instead of comparing all of the leaves of a node pair, the invention may consider only the immediate descendants of the elements being compared. Using the leaves for measuring structural similarity identifies most of the matches that this alternative scheme does. However, using the leaves ensures that schemas, which have a moderately different substructure (e.g., nesting of elements), but essentially the same data content (similar leaves), are correctly matched.

If matches between internal nodes of the data path tree are important to the result, then a second pass in the calculation of structural similarity is utilized. The reason is that the first pass of calculating structural similarities has the effect of updating the similarities of the subtree structures. So, at the end of the calculation the structural similarity of some pairs of elements may no longer be consistent with the similarities of their subtrees.

After the calculation of structural similarity is completed for all nodes of the models, i.e., for all nodes that were not pruned from the calculation, a post-processing step may be performed on the structural similarity values to construct a mapping between the two models. For example, as part of the post-processing, the two trees can again be traversed in inverse topological order, and each node of the target can be matched with the node of source with which it has highest structural similarity.

Other aspects of the invention are set forth below.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have data sets for which it would be desirable to perform the matching algorithms of the present invention.

Figure 2A:
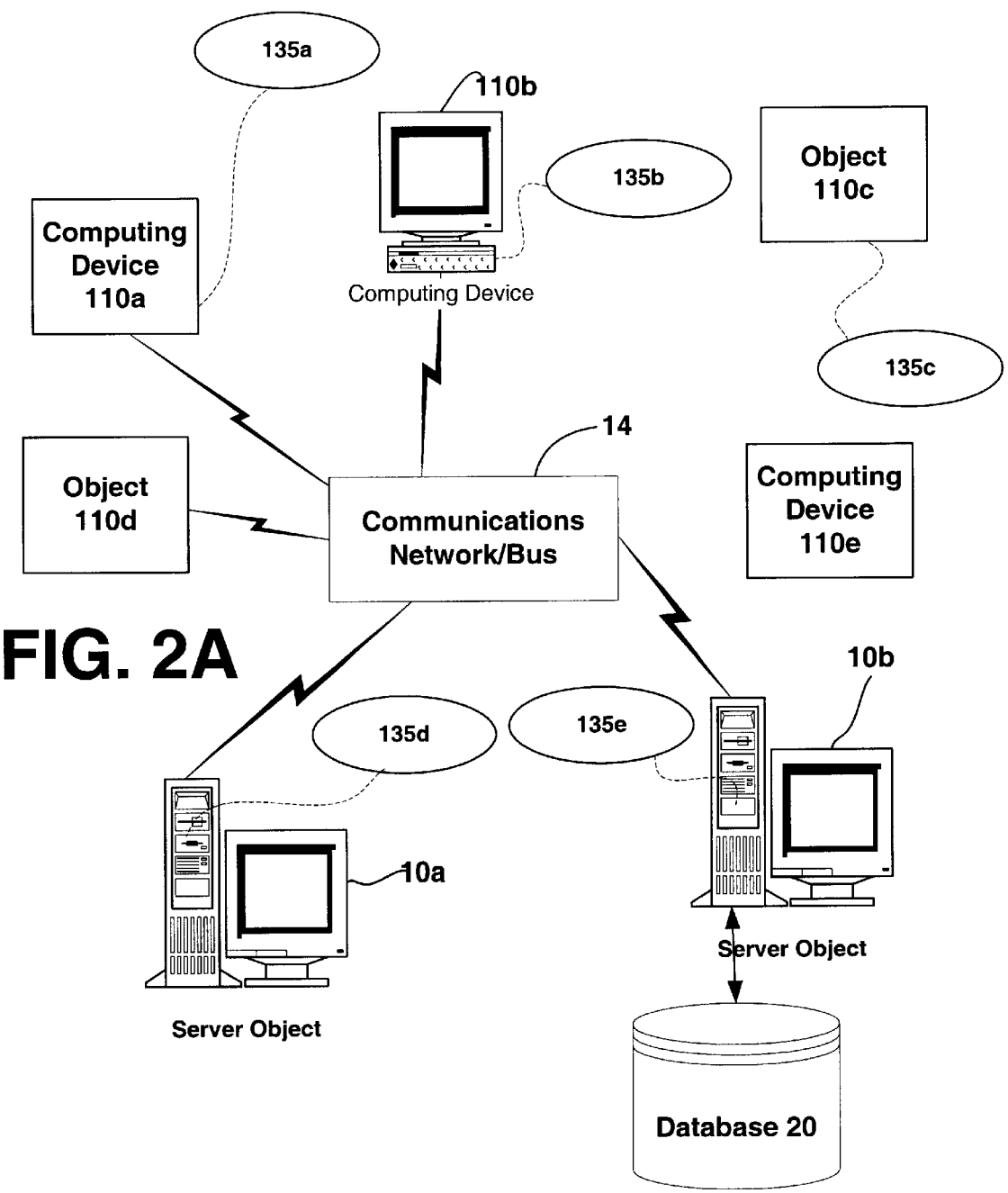
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2A. In accordance with an aspect of the invention, each object 10 or 110 may contain data such that it would be desirable to match that data to other data of other objects 10 or 110. For example, where one of the objects may possess SQL data, another of the objects may possess XML data, and it may be desirable to provide a mapping between the associated schemas.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients thereby increasing the capability and efficiency of the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. As one of ordinary skill in the distributed computing arts can appreciate, the matching algorithm(s) of the present invention may be implemented in such an environment.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and is accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment Media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data based upon common ground. The matching algorithm(s) of the present invention may provide such common ground by providing mappings between the disparately structured and named data.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to communicate to another computing device with respect to matching services.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database 20 for storing schema or model data in accordance with the present invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Exemplary Computing Device

Figure 2B:
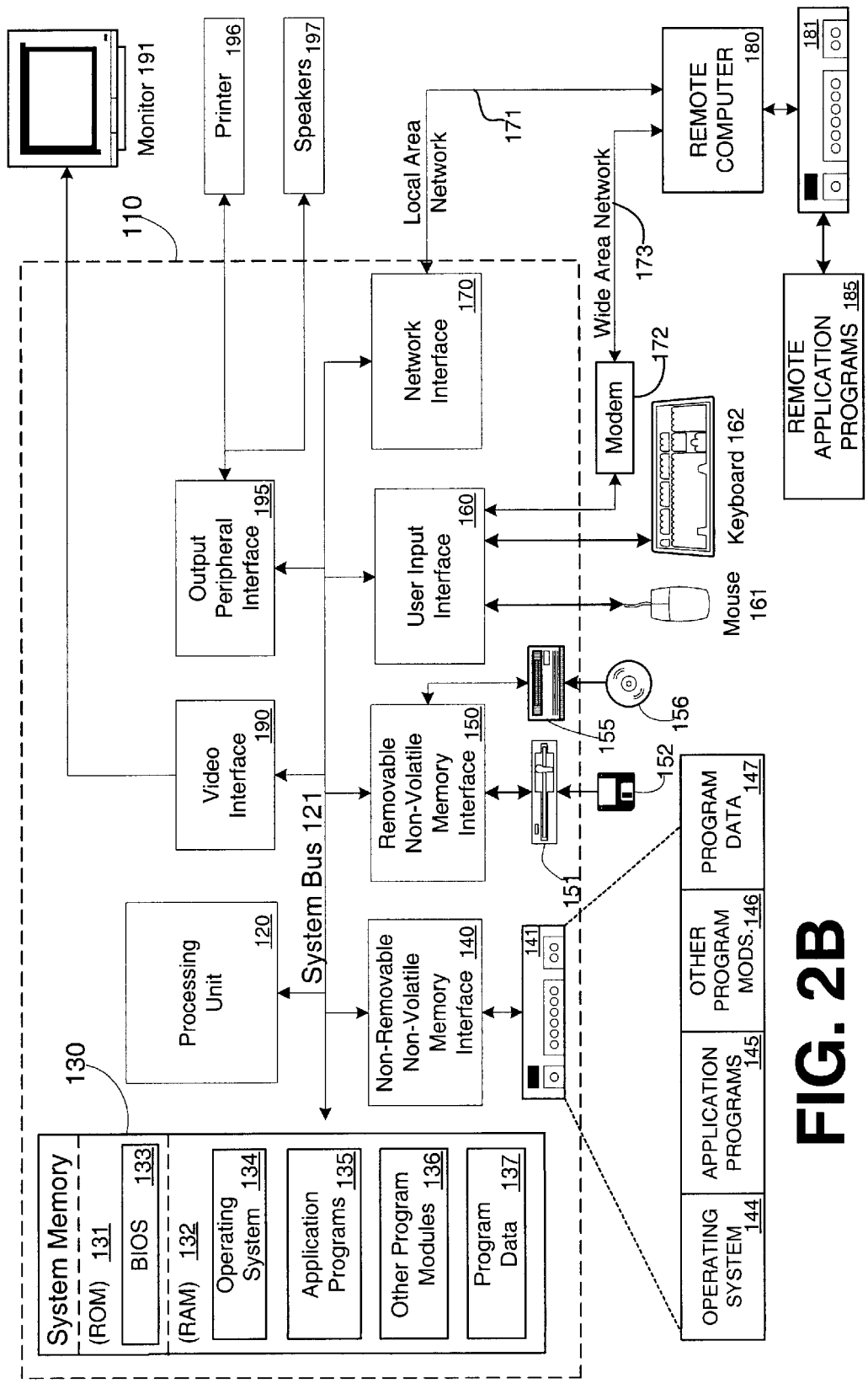
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention requires only a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or to which data may be retrieved is a desirable, or suitable, environment for operation of the matching algorithm(s) of the invention.

Although not required, the invention can be implemented via an operating system, for use by a developer of services for a device or object, and/or included within application software which aids in matching data sets. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, such as information processed according to the invention or information incident to carrying out the algorithms of the invention. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

.NET Framework

.Net is a computing framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net platform includes servers, building-block services, such as Web-based data storage and downloadable device software.

Generally speaking, the .Net platform provides (1) the ability to make the entire range of computing devices work together and to have user information automatically updated and synchronized on all of them, (2) increased interactive capability for Web sites, enabled by greater use of XML rather than Hyptertext Markup Language (HTML), (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with software residing on a computing device, portions of the invention may also be implemented via an operating system or a "middle man" object between a network and device or object, such that data matching services may be performed by, supported in or accessed via all of Microsoft's .NET languages and services.

Model Matching—Exemplary Computations and Embodiments

Having described exemplary computing devices and computing environments in which the present invention may be implemented, various non-limiting embodiments of the systems and methods for automatically and generically matching models in accordance with the invention are set forth below. Various embodiments of the invention described below include one or more of the integrated use of linguistic and structural matching, context dependent matching of shared types and a bias toward subtree structure where much of the schema content resides. The systems and methods are generic since they may be applied to hierarchical data sets outside of any particular data model or application.

Figure 3:
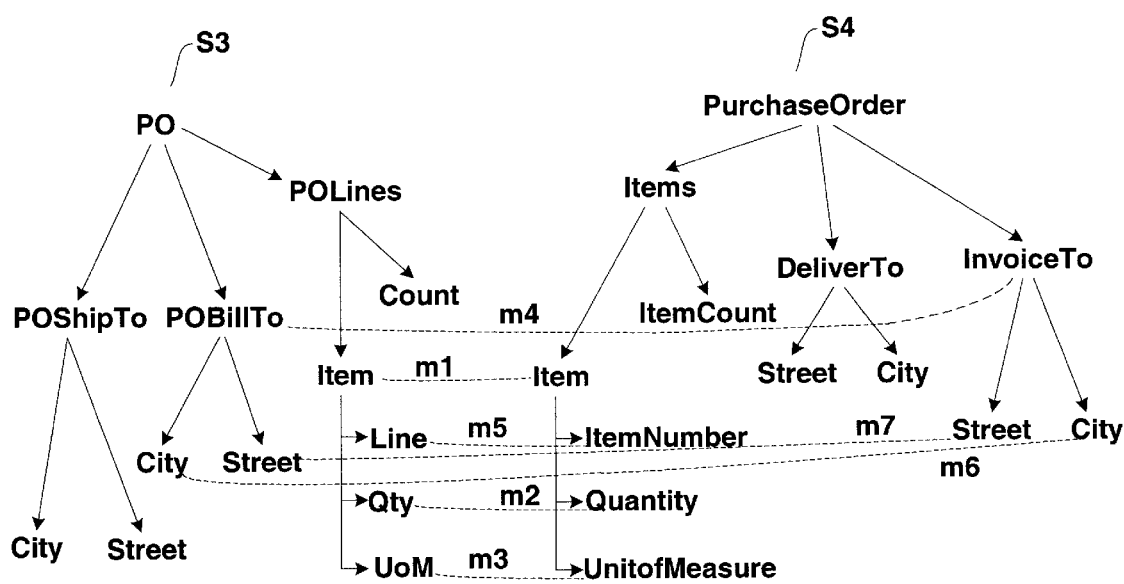
FIG. 3 illustrates two exemplary schemas and corresponding mappings based upon similarity coefficients generated in accordance with the present invention.

By way of the exemplary schemas S3 and S4 of FIG. 3, aspects of the present invention may be illustrated in connection with matching two similar schemas PO and Purchase Order. The schemas are encoded as graphs, where nodes represent schema elements. Although even a casual observer can see the schemas are very similar, there is much variation in the naming and the structure that makes algorithmic matching quite challenging.

The present invention approaches the matching problem by computing similarity coefficients between elements of the two schemas, from which a mapping between the elements may be deduced. The coefficients, in the [0,1] range, are calculated in two phases: inherent matching and structural matching.

The first phase, inherent matching, which may be linguistic matching, matches individual schema elements based on their names, data types, domains, etc. One or more dictionaries and/or thesauri can be used to help match names by identifying short forms (Qty for Quantity m2), acronyms (UoM for UnitOfTeasure m3) and synonyms (Bill and Invoice m4). The result is a linguistic similarity coefficient, lsim, between each pair of elements, e.g., lsim1 for m1, lsim2 for m2, etc.

The second phase is the structural matching of schema elements based on the similarity of their contexts or vicinities. For example, Line is mapped to ItemNumber m5 because their parents, i.e., Item, match and the other two children of Item, i.e., Qty for Quantity and UoM for UnitOfMeasure, already match. The structural match depends in part on linguistic matches calculated in phase one. For example, City and Street under POBillTo match City m6 and Street m7 under InvoiceTo, rather than under DeliverTo, because Bill is a synonym of Invoice but not of Deliver. The result is a structural similarity coefficient, ssim, e.g., ssim1 for m1, ssim2 for m2, etc. for each pair of elements.

After calculating the inherent and structural coefficients for each node pair, a weighted similarity (wsim) is calculated for each node pair, which is a function, such as the mean or weighted mean, of lsim and ssim. One such weighted similarity calculation is as follows:

$$wsim = w_{struct} * ssim + (1 - w_{struct}) * lsim,$$

where the constant $w_{struct}$ is in the range 0 to 1.

Then, an optional additional step that may be performed is mapping generation, wherein pairs of schema elements with maximal weighted similarity are chosen for mappings between the schema elements. The inherent matching phase, structural matching phase and mapping generation techniques of the invention are described in more detail in connection with various exemplary embodiments below.

The linguistic matching of the invention is based primarily on schema element names. In the absence of data instances, such names are probably the most useful source of information for matching. The invention also makes modest use of data types and schema structure in this phase. Inherent matching, such as linguistic matching, proceeds in three steps in one embodiment: normalization, categorization and comparison. The steps of normalization, categorization and comparison are described in much more detail below in the section relating to inherent similarities. For now, however, it can be understood that as a result of the comparison of the inherent matching, a set of inherent similarity coefficients lsim are generated as between node pairs of the models being compared.

For structure matching, an algorithm is presented herein for hierarchical schemas, i.e., tree structures generated from the generic modeling performed in accordance with the invention. As presented in more detail below, the generic modeling may be extended to include richer schemas that have shared data types and referential integrities. For each pair of the source and target tree structures, the algorithm computes a structural similarity, ssim, which is a measure of the similarity of the contexts in which the elements occur in the two schemas. From ssim and lsim, a weighted similarity wsim is computed according to a function, such as a mean calculation, that may be weighted. The above wsim calculation is illustrative in this regard.

The below describes an exemplary tree matching algorithm in accordance with the inherent, structural and weighted similarity computations of the invention:

```
TreeMatch(SourceTree S, TargetTree T)
for each s ∈S, t ∈T where s, t are leaves
    set ssim (s, t) = datatype-compatibility(s, t)
S' = post-order(S), T' = post-order(T)
for each s in S'
    for each t in T'
    compute ssim(s, t) = structural-similarity(s, t)
    wsim(s, t) = w_struct * ssim(s,t) + (1-w_struct) * lsim(s, t)
    if wsim(s, t) > th_high
        increase-struct-similarity(leaves(s), leaves(t), c_inc)
    if wsim(s, t) < th_low
        decrease-struct-similarity(leaves(s), leaves(t), c_dec)
```

In one non-limiting embodiment, the structural similarity of two leaves is initialized to the type compatibility of their corresponding data types, although the structural similarity may be initialized to other values respecting subtrees as well. In one implementation, this initialization value ([0, 0.5]) is a lookup in a compatibility table. Identical data types have a compatibility of 0.5. As described below, a value of 0.5 allows for later increases or decreases in structural similarity based on increases or decreases in confidence.

After initialization, the elements in the two trees are enumerated in inverse topological order, such as post-order, which is uniquely defined for a given tree. Both the inner and outer loops are executed in this order. The first step in the loop computes the structural similarity of two elements (s, t). For leaves, this is the value of ssim that was initialized in the earlier loop. When one of the elements is not a leaf, the structural similarity is computed as a measure of the number of leaf level matches in the subtrees rooted at the elements that are being compared, reflecting the intuition that when leaf structure is similar, so will be the structure of the root elements. The invention indicates that a leaf in one schema has a strong link to a leaf in the other schema if their weighted similarity exceeds a threshold $th_{accept}$. Exceeding the threshold $th_{accept}$ indicates a potentially acceptable mapping. In one implementation, the structural similarity is estimated as the fraction of leaves in the two subtrees that have at least one strong link (and are hence mappable) to some leaf in the other subtree, as represented by the following exemplary equation:

$$ssim(s, t) = \frac{\left| \begin{array}{l} \{x \mid x \in \text{leaves}(s) \land \exists\, y \in \text{leaves}(t), \text{stronglink}(x, y)\} \\ \bigcup \{x \mid x \in \text{leaves}(t) \land \exists\, y \in \text{leaves}(s), \text{stronglink}(y, x)\} \end{array} \right|}{\mid \text{leaves}(s) \bigcup \text{leaves}(t) \mid}$$

where leaves(s)=set of leaves in the subtree rooted at s. Two leaves have a strong link if their weighted similarity is greater than a pre-defined threshold. Once the inherent and structural values are known for the model elements being compared, the weighted similarity is computed.

Then, if the two elements being compared are highly similar, i.e., if their weighted similarity exceeds the threshold $th_{high}$, then the structural similarity (ssim) of each pair of leaves in the two subtrees (one from each schema) may be increased by the factor $c_{inc}$ (ssim not to exceed 1 in this example). The rationale is that leaves with highly similar ancestors occur in similar contexts. So the presence of such ancestors should reinforce their structural similarity. For example, in FIG. 3, if POBillTo is highly similar to InvoiceTo, then the structural similarity of their leaves City and Street would be increased, to bind them more tightly than to other City and Street pairs. For similar reasons, if the weighted similarity is less than the threshold $th_{low}$, the structural similarities of leaves in the subtrees may be decreased by the factor $c_{dec}$. The linguistic similarity, however, remains unchanged.

The algorithm of the invention recognizes when the leaves in two subtrees match, even if the subtree structures that contain them do not match precisely. This is often the case when the top-level organization of the same data is very different in the two models. This is why it is beneficial to use leaves rather than internal nodes when comparing two subtrees.

Figure 4:
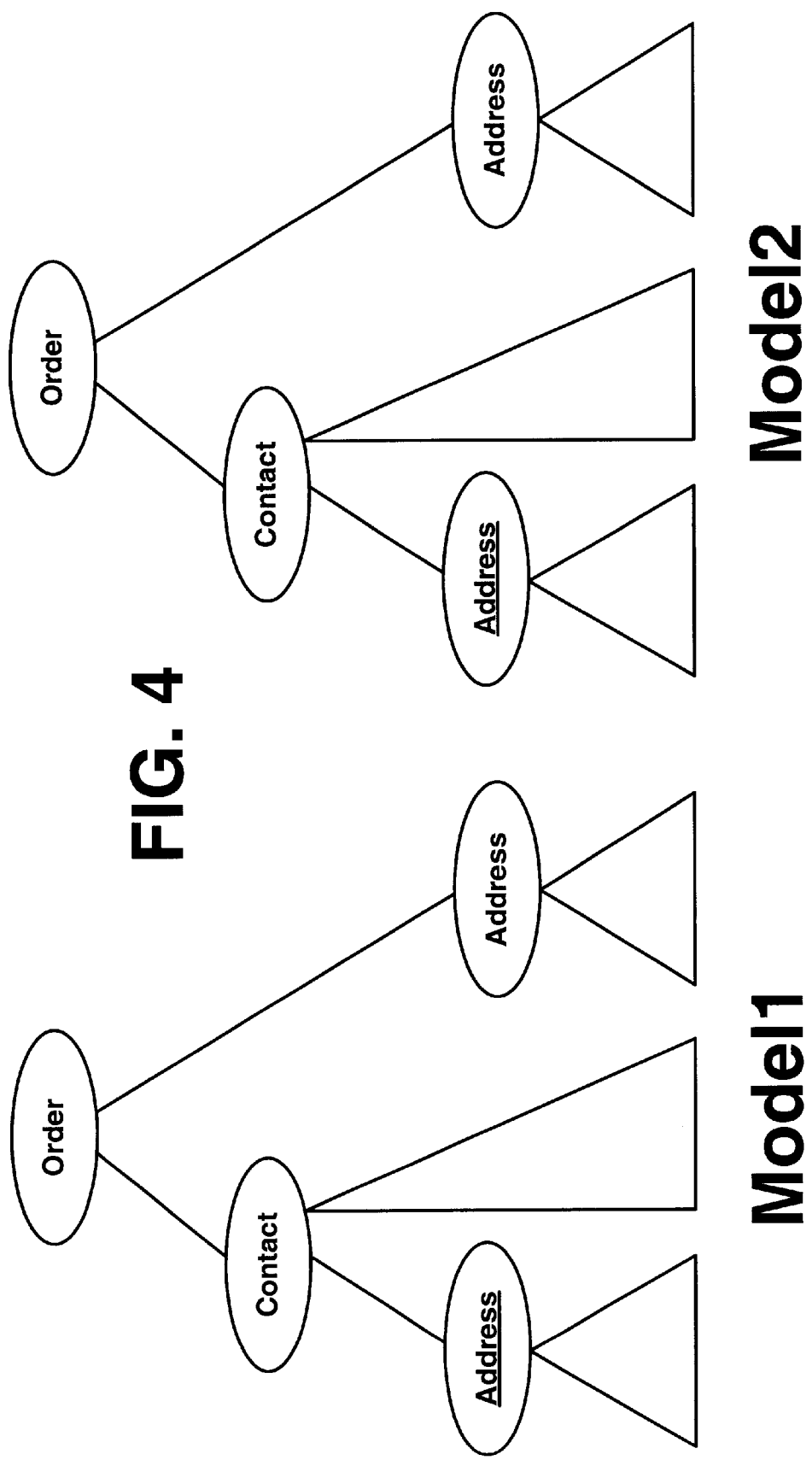
FIG. 4 illustrates an exemplary second pass calculation of structural similarity between two models in accordance with the invention.

Since at the end of the calculation the structural similarity of some pairs of elements may no longer be consistent with the similarities of their leaves, a second pass in the calculation of the structural similarity may be utilized. For example, in FIG. 4, suppose the subtrees under the Address and Address elements are identical, as shown by the identical triangles underneath. Then, during the post-order traversal, the Address element in Model1 will have the same structural similarity to both the Address and Address elements of Model2. Then, suppose the Contact elements in the two models are compared in the structural similarity calculation and it is determined that they have a structural similarity greater than the threshold $th_{high}$, thereby causing the similarity of their leaf sets to be increased. If the structural similarity of the two Address elements were then recalculated during a second pass, the initial structural similarity used for the second pass structural similarity calculation would be higher than its value resulting from the first calculation, because the leaf sets' similarity was raised. Moreover, this higher value would now cause the Address element of Model1 to have a higher structural similarity to the Address element of Model2 than to the Address of Model2, thereby changing the result of the match.

Unlike the first pass of calculating structural similarity, however, the second pass does not increase the similarity of leaf sets. Therefore, only two passes are utilized, i.e., if a third pass were performed, the third pass would yield the same value as the second pass since none of the inputs to the second pass's structural similarity calculation will have changed, and inherent similarity remains the same. The second pass calculation may thus be considered an optional further step to the algorithm:

For each node s of the source tree,
For each node t of the target tree, $$wsim(s, t) = w_{struct} * ssim(s,t) + (1-w_{struct}) * lsim(s, t)$$

where ssim(s, t) may be calculated as before.

Mapping generation is one process that can benefit from a second pass calculation by recomputing the similarities of the nonleaf elements, since the updating of leaf similarities during tree match may have affected the structural similarity of nonleaf nodes after they were first calculated. After this recalculation, a scheme similar to leaf level mapping generation can be used. The mapping that is produced consists of a list of mapping elements or correspondences. A further step may be to enrich the structure of the map itself. For example, the mapping element between two XML elements e1 and e2 may have as its subelements the mapping elements between matching XML attributes of e1 and e2.

The outputs of schema matching are sets of inherent and structural similarity coefficients, from which weighted similarity coefficients are calculated. Thus, with respect to mapping generation more generally, mapping elements may be generated by using any one or more of the computed linguistic, structural and weighted similarities. In the simplest case, the invention might just use leaf level mapping elements. For each leaf element t in the target schema, if the leaf element s in the source schema with highest weighted similarity to t is acceptable (wsim(s, t)$\geq$th$_{accept}$), then a mapping element from s to t is returned. This resulting mapping may be 1:n, since a source element may map to many target elements. The exact nature of a mapping is often dependent on requirements of the module that accepts these mappings. For example, query discovery might require a one to one mapping instead of the 1 to n mapping. Such requirements need to be captured by a data model specific or tool specific mapping generator that takes the computed similarities as input.

In one embodiment of the invention, initial mappings are provided. In this case, the matcher algorithm utilizes a user supplied initial mapping to help initialize leaf similarities prior to structural matching, described above. The linguistic similarity of elements marked as similar in the initial map is initialized to a predefined maximum value. Such a hint can lead to higher structural similarity of ancestors of the two leaves, and hence a better overall match. Additionally, a user can make corrections to a generated result map, and then rerun the match with the corrected input map, thereby generating an improved map. Thus, initial maps are a way to incorporate user interaction into the matching process. In one embodiment, this is information about two leaves, branches or nodes in two schemas being matched that map. This information may also be broken down by the user as to whether the input is being made based on actual user knowledge of structural information and/or linguistic information.

In another embodiment of the invention, a pruning leaves process is provided. In a deeply nested schema tree with a large number of elements, an element e high in the tree has a large number of leaves. These leaves increase the computation time, even though many of them are irrelevant for matching e. Therefore, it may be better to consider only nodes in a subtree of depth k rooted at node e, thereby pruning the leaves. While comparing nearly identical schemas, it might seem wasteful to compare the leaves. To avoid this, the immediate children of the nodes are first compared. If a very good match is detected, then the leaf level similarity computation is skipped.

The invention as described above operates on XML and relational schemas, which techniques may be applied to other schemas. The output mappings are displayed by a standalone application such as BIZTALK MAPPER®, which can compile them into eXtensible Stylesheet Language (XSL) translation scripts. As described in the sections regarding exemplary computing and network environments, such a mapping service may also be downloaded from a server in a network, provided by an application service provider, provided as part of an operating system, etc.

The following is a brief description of the criteria for setting the different thresholds and parameters used in the algorithm and presents some typical values for them. The exemplary values listed are non-limiting in this regard, and are recited merely to illustrate one example for each. One of ordinary skill in the art can appreciate that parameters, by their very nature, may be changed to reflect various design nuances or challenges.

The parameter th$_{high}$ is used in connection with the determination as to whether wsim(s,t)$\geq$th$_{high}$. If so, then the structural similarity between all pairs of leaves in the two subtrees rooted at s and t is increased. While the invention does not lie in any particular value of this parameter, the parameter should be chosen to be greater than th$_{accept}$. An exemplary value for th$_{high}$ is 0.6.

The parameter th$_{low}$ is used in connection with the determination as to whether wsim(s,t)$\leq$th$_{low}$. If so, then the structural similarity between all pairs of leaves in the two subtrees rooted at s and t is decreased. While the invention does not lie in any particular value of this parameter, the parameter should be chosen to be less than th$_{accept}$. An exemplary value for th$_{low}$ is 0.35.

The parameter c$_{inc}$ is the multiplicative factor by which leaf structural similarities are increased. The parameter c$_{inc}$ is typically a function of maximum schema depth or depth to which nodes are considered for structural similarity. An exemplary value for the parameter c$_{inc}$ is 1.2.

The parameter c$_{dec}$ is the multiplicative factor by which leaf structural similarities are decreased. Typically, the parameter c$_{dec}$ is set to be about c$_{inc}^{-1}$. For example, an exemplary value for the parameter c$_{dec}$ is 0.9.

The parameter th$_{accept}$ is used in connection with the determination of whether wsim(s,t)$\geq$th$_{accept}$, suggesting whether s and t have a strong link or have a valid mapping element. An exemplary value for the parameter th$_{accept}$ is 0.5.

The parameter w$_{struct}$ is the structural similarity contribution to wsim. Typically, this value is different for leaves and nonleaves, with the value being lower for leaf-leaf pairs than for nonleaf pairs. An exemplary range for this value is from 0.5 to 0.6.

The present invention improves on past methods in many respects, for example, by including a substantial linguistic matching step and by biasing matches by leaves of a schema. While merely one novel feature described herein, no prior art techniques have been known to relate objects that have similar leaf sets in the manner employed by the present invention. The invention makes such consideration due to the observation that leaves describe the technical content of a schema, e.g., the columns of a table or the attributes and leaf elements of an XML model, which is often a more important match criterion than internal structure. The internal structure is sometimes arbitrary, where different designers group the same information in different ways due to differences in taste. Sometimes the differences are due to limitations of the data models in which schemas are represented. For example, in SQL, table definitions are flat, whereas XML schemas can have nested subelements to represent substructure.

The algorithm may be implemented as an independent component, or integrated into a particular application. The present invention may also be combined with other techniques, such as machine learning applied to instances, natural language technology, and pattern matching to reuse known matches. The invention thus provides a general-purpose schema matching component that can be used in systems for schema integration, data migration, etc.

Figure 5:
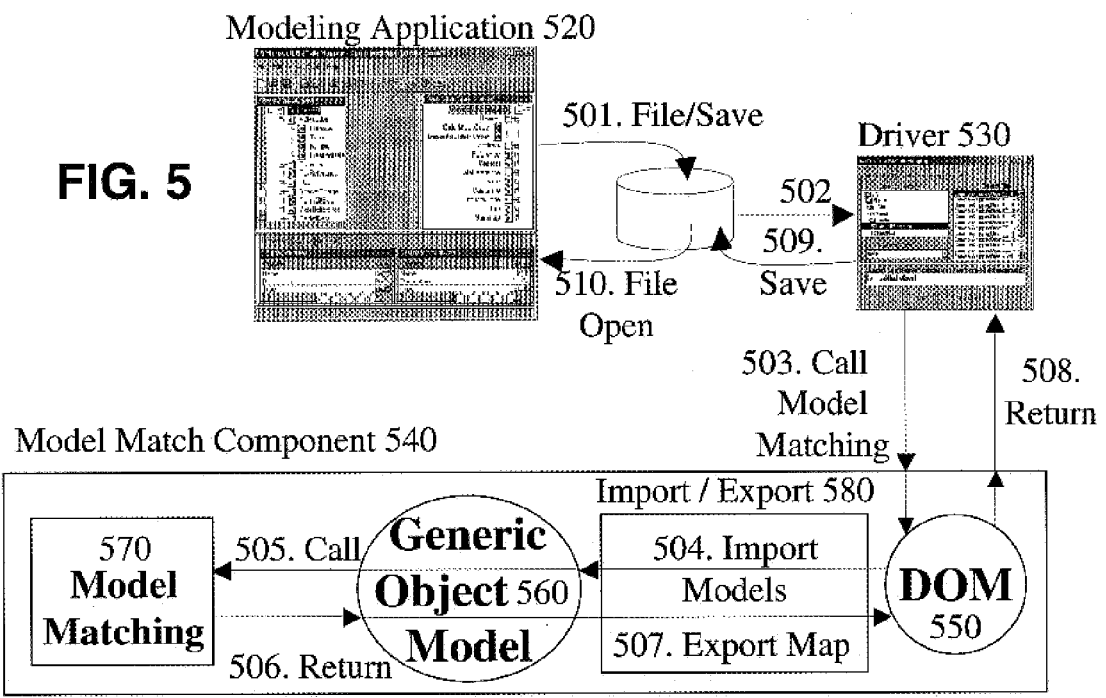
FIG. 5 illustrates an exemplary non-limiting top-level architecture of an exemplary system in which the present invention may operate.

FIG. 5 illustrates an exemplary non-limiting top-level architecture of an exemplary system in which the present invention may operate. Import-export module 580 and generic model matching algorithm 570 may be combined in a single component 540, such as a COM component, e.g., a dynamic link library (DLL) that can be loaded by any application that requests component 540. Two schemas are accepted, encoded in some format such as the XML Document Object Model (DOM) 550. For example, relational schemas can be represented in the SQL subset of Semantic Modeling Format (SMF), which is an XML-based data exchange format used by the English Query facility in MICROSOFT® SQL Server, while XML schemas can be represented in either SMF or XDR format, both of which are XML and therefore it is known to parse them into DOM format. The system then produces an output map, which may also be in DOM format. There can also be an optional input map that serves as a hint to the matching algorithm.

The use of XML DOM 550 as the input and output format to communicate between the graphical user interface (GUI) and model matching component 540 is merely a convenience, and any format may be accommodated since the invention provided is a generic solution. Any format that can be imported into the generic object model is satisfactory. The import/export module 580 converts the DOM representation 550 of the input schemas into the internal object model 560 of model matching component 540.

The matching algorithm 570 operates on two models represented in the internal object model 560 and computes a node similarity matrix, which may be transformed into a map, which is also represented in the internal object model 560. Thus, the algorithm 570 is generic and depends only on the generic object model, which is unaffected by the data model used to represent the input models. Conversion of schemas to a generic object model is described in more detail below in the section regarding generic object modeling.

The generic model matching component 540 is designed to be extensible. In one embodiment, its top-level procedure simply calls multiple matching algorithms in sequence, all of which have the same interface. Each matching algorithm can be implemented as a separate sub-module. These sub-modules can pass matching information between each other through the top-level procedure. This modular structure allows new model matching algorithms to be added without altering the overall structure of model matching component 540.

The exemplary system of FIG. 5 may include two different matching algorithms (i.e., sub-modules) combined to perform the matching algorithms of the present invention, or the two matching algorithms may be integrated. The first algorithm may match individual elements of the schemas by using linguistic information about the name of each element and by using each element's data type. Other type-oriented information can be added to the generic object model so that the algorithm can exploit items such as whether there are null elements, default values, whether values are members of an enumeration and whether elements are mandatory or optional.

The second algorithm may be the structure-matching component that exploits the hierarchical or graph-like structure of the schemas. This sub-module may match elements whose neighborhoods in the two schemas also match. These two algorithms may produce corresponding similarity coefficients, from which weighted similarity coefficients may be constructed, and from which a resultant map may be constructed based on a combination thereof. As mentioned, a single component could perform both the linguistic and structural analysis.

Thus, a modeling application 520 may open 510 or save 501 a file having data sets, or mapping data for the data sets, etc. In this exemplary embodiment, a driver 530 assists in retrieving 502 or saving 509 data from or to a data store, and also makes calls 503 and receives results from a model match component 540 in accordance with the invention. In this embodiment, calls are made in XML DOM format 550. An import/export object 580 of match component 540 imports models 504 from and exports mappings 507 for the data sets of DOM 550. Once imported, the invention abstracts the data sets to a generic object model 560 and calls 505 the model match module 570 to perform the model match algorithm(s) of the invention. Model match module 570 returns 506 the results in terms understood by the generic object model 560 utilized by the invention. The user can modify a generated result map, making corrections, and then perform the model match again with the corrected map as an input, thereby generating an improved map. Thus, initial mappings provide a means of capturing user interaction with the model matching process.

Thus, one implementation of the invention may be to incorporate the algorithm(s) into a matching application or tool that provides a user interface for mapping two schemas, with appropriate user interaction with the mapping process to subjectively validate the quality of result.

Figure 6:
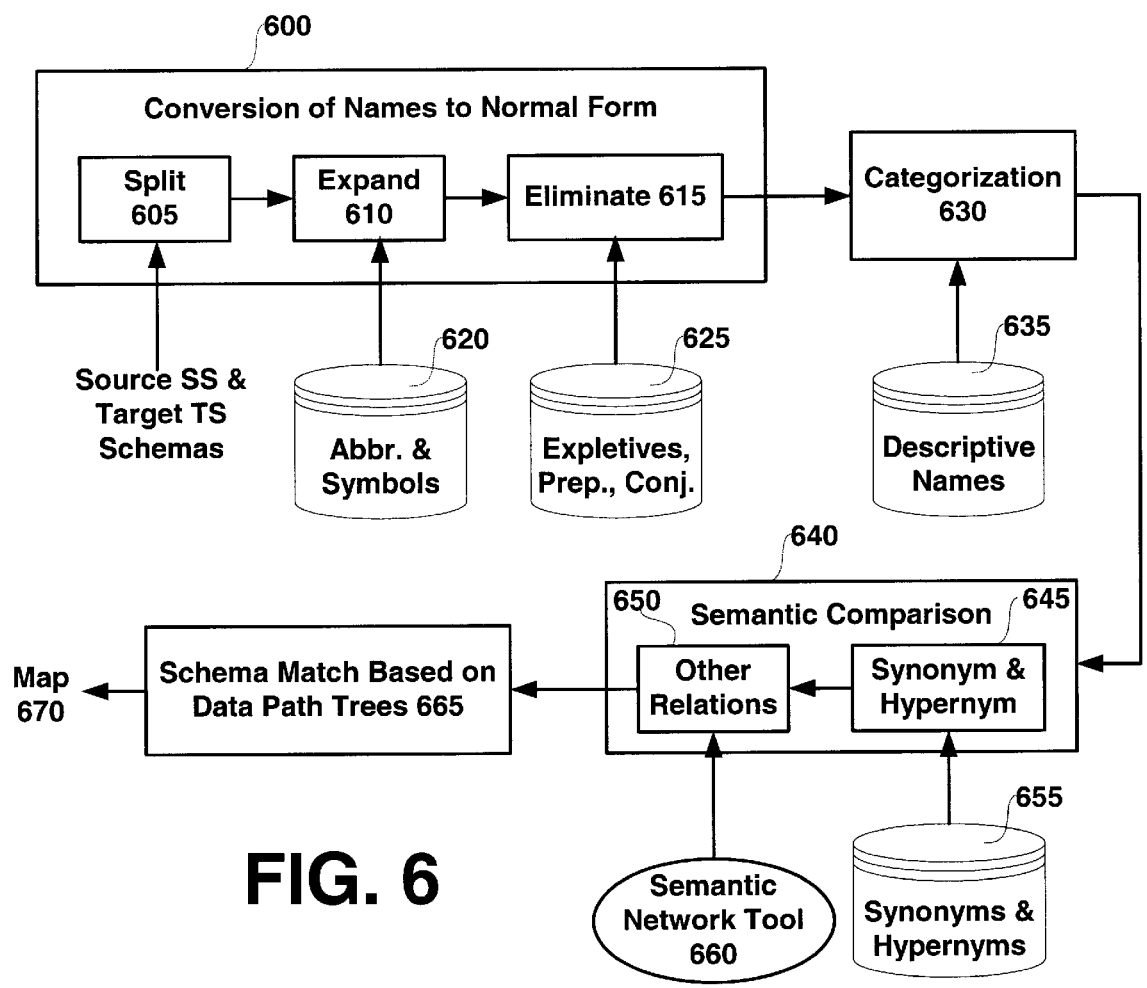
FIG. 6 illustrates an exemplary process diagram for processing two schemas to produce a mapping therebetween in accordance with the invention.

In one configuration, the performance of the algorithm(s) of the invention may comprise several phases, as shown in FIG. 6. The inherency matching component involves elements 600 to 660 and operates on the name of model elements and certain other information that may be data model specific, such as data types and names of Strong Containers. The structural matching component involves element 665. As described earlier, from inherency matching coefficients and structural matching coefficients, a mapping may be produced between two schemas.

A Conversion of Names to Normal Form component 600 includes three sub-components, split 605, expand 610 and eliminate 615, to normalize the input name data. First, source SS and target TS schemas are input to any one or more of the embodiments of the model match algorithms of the invention and are tokenized by split sub-component 605 to convert the name(s) of the model elements to a normal form. With respect to abbreviations and acronyms, common abbreviations and acronyms are maintained in a data store 620 and are used to substitute for the true content by expand sub-component 610. Eliminate sub-component 615 eliminates expletives, prepositions and conjunctions. A list of expletives, prepositions, conjunctions and other unhelpful input items may be stored in a data store 625.

As to categorization 630, after converting a name to a set of word tokens, additional word tokens are added to the normal form to describe each model element's data type, if it has one, and concepts to which it is related. These additions are mostly driven by the content of another data store 635, which associates words with concepts. It can be appreciated that data stores 620, 625, 635 etc. may also be integrated. Categorization is performed separately for each model SS and TS, since the notion of compatibility may be different for a single model than for a pair of models.

After adding these tokens to the normal form, model elements are grouped into categories based on common tokens. Each category is associated with a set of keywords that describe the category. Once categorized, name similarity is calculated using a name similarity algorithm, which may include an analysis of synonyms and hypernyms 645 and/or an analysis of other relations 650.

The invention is not limited to analysis based upon sub-component 645. Other options 650 include querying a semantic network tool 660, which builds relationships and computes similarities among words by parsing a dictionary or thesaurus. However, performing such queries on the fly might be time consuming. On-the-fly querying of the semantic network tool 660 could be avoided by a pre-processing step that uses information in the semantic network tool 660 to populate the thesaurus 655. Or it could be a post-processing step after the matching process that adds new similarity relationships in the thesaurus for word pairs that were not found during the matching.

Once tokenized, the linguistic similarity of two model elements s and t, standing for the source and target models, respectively, is computed using the name similarity of the tokenized normal forms and data type similarity.

Some model elements are not name matched because they do not have a name or their name is not significant. For example, a key does not have a name, but the columns that comprise the key do. Only model elements that have been tagged to be name-matched are actually name-matched. This tagging is dependent on the mapping of elements of the particular data model to the internal object model. For SQL schemas, the schema, tables and columns are tagged to be matched. For XML, the ElementTypes and AttributeTypes are tagged to be matched.

With respect to schema matching component 665, in addition to linguistic matching, the hierarchical relationships in the schema are leveraged to infer mappings. This is achieved using the above-described tree matching algorithm that matches tree representations of the different data paths in the two schemas. Thus, at some point in the process, a transformation is applied to the schemas to represent them as trees of data paths for structural analysis. The tree-matching algorithm 665 operates on a pair of data path trees to produce structural similarity coefficients. Each pair of nodes of the two trees being compared then have an associated pair of similarity coefficients, namely the inherent similarity of the two model elements to which they correspond, and the structural similarity of the two nodes computed by the schema matching algorithm 665. The effective similarity is then calculated to be a weighted function of these two coefficients.

Inherent Similarities

As related above, one type of similarity that is taken into account by the matching algorithm is inherent similarity. This type of similarity attempts to take into account those kinds of similarities between schemas that do not relate to the structure, i.e., the hierarchical relationships between model elements.

As mentioned, prior to the computation of inherent similarity coefficients, certain normalization and categorization of the model elements is performed. With respect to normalization, many semantically similar schema element names contain abbreviations, acronyms, punctuation, etc. that make them syntactically different. To make them comparable, the invention normalizes them into sets of name tokens, as follows:

The tokenization of the invention parses names into tokens by a customizable tokenizer using punctuation, upper case, special symbols, digits, etc. For example, POLines→{PO, Lines}. Abbreviations and acronyms may also be expanded, e.g., {PO, Lines}→{Purchase, Order, Lines}. Elimination is also performed, when appropriate, wherein tokens that are articles, prepositions, expletives or conjunctions are marked to be ignored during comparison. Tagging may also be performed whereby a schema element that has a token related to a known concept is tagged with the concept name, e.g., elements with tokens price, cost and value are all associated with the concept money. The abbreviations, acronyms, ignored words and concepts may be determined by one or more thesaurus lookups. A thesaurus can include terms used in common language as well as domain-specific references, e.g., specialized terms used in purchase orders. In an exemplary embodiment, each name token is marked as being one of five token types: a number, a special symbol (e.g., #), a common word which token type includes prepositions and conjunctions, a concept as explained above or content (all the rest).

Thesauri can thus play a role in linguistic matching. The effect of dropping the thesaurus varies. The tokenization performed by the invention, followed by stemming, can aid in the automatic selection of possible word meanings during name matching and make it easier to use off-the-shelf thesauri. One implementation includes using a module to incrementally learn synonyms and abbreviations from mappings that are performed over time. The use of linguistic similarity and structural similarity over time can provide a synergy of benefit to these results.

With respect to categorization, the invention clusters schema elements belonging to the two schemas into categories. A category is a group of elements that can be identified by a set of keywords, which are derived from concepts, data types, and element names. For example, the category money includes each schema element that is associated with money, i.e., "money" appears in its name or it is tagged with the concept of Money. The purpose of categorization is to reduce the number of element-to-element comparisons. By clustering similar elements into categories, the invention may compare those elements that belong to compatible categories. Two categories are compatible if their respective sets of keywords are "name similar," a phrase defined below.

Categories and keywords are determined with the following: concept tagging, data types and containers. Concept tagging refers to assigning a category per unique concept tag in the schema. Data types refer to assigning a category for each broad data type, e.g., all elements with a numeric data type are grouped together in a category with the keyword Number. Like all categorization criteria, data types are used primarily to prune the matching and do not contribute significantly to the linguistic similarity result. With respect to containers, a schema element that "contains" other elements defines a category. For example, Street and City are contained by Address and hence can be grouped into a category with keyword Address. Containment is described in more detail below. The invention constructs separate categories for each schema. For each element, the invention inserts the element into an existing category (same data type, same concept, or same container) if possible, or otherwise creates new categories. In this regard, each schema element may belong to multiple categories. Each relationship is either a containment or non-containment relationship, and is directed from its origin object to its destination object. A model is identified by a root object and includes all objects that are reachable from the root by following containment relationships in the origin-to-destination (container-to-containee) direction.

With respect to the phrases "name similar" or "name similarity," the similarity of two name tokens t1 and t2, defined mathematically as sim(t1, t2), is looked up in one or more synonym and/or hypernym thesauri. Each thesaurus entry is annotated with a coefficient in the range [0,1] that indicates the strength of the relationship. In the absence of such entries, the invention matches substrings of the words t1 and t2 to identify common prefixes or suffixes. The name similarity (ns) of two sets of name tokens T1 and T2 is the average of the best similarity of each token with a token in the other set. Name similarity, in an exemplary embodiment, is calculated according to the following equation:

$$ns(T_1, T_2) = \frac{\sum_{t_1 \in T_1}\left[\max_{t_2 \in T_2} sim(t_1, t_2)\right] + \sum_{t_2 \in T_2}\left[\max_{t_1 \in T_1} sim(t_1, t_2)\right]}{|T_1| + |T_2|}$$

Two categories are compatible if the name similarity of their token sets exceeds a given threshold, $th_{ns}$. The parameter $th_{ns}$ is the name similarity threshold for determining compatible categories. This value is used for pruning the number of element-to-element linguistic comparisons, and thus a variety of choices for assigning the actual value are available. For example, 0.5 may be chosen for $th_{ns}$, although other values may be suitable depending upon a desired amount of pruning.

With respect to comparison, the invention calculates the linguistic similarity of each pair of elements from compatible categories. Linguistic similarity is based on the name similarity of elements, which is computed as a weighted mean of the per token type name similarity, wherein each token is one of the exemplary five types listed above. If $T_{1i}$ and $T_{2i}$ are the tokens of elements $m_1$ and $m_2$ of type i, the name similarity of $m_1$ and $m_2$ is computed as follows:

$$ns(m_1, m_2) = \frac{\sum_{i \in TokenType} w_i \times ns(T_{1i}, T_{2i})}{\sum_{i \in TokenType} w_i \times (|T_{1i}| + |T_{2i}|)}, \text{ where} \sum w_i = 1$$

Content and concept tokens are assigned a greater weight ($w_i$), since these token types are more relevant than numbers and conjunctions, prepositions, etc. In one implementations, the inherent similarity, or linguistic similarity (lsim), is computed by scaling the name similarity of the model elements by the maximum similarity of categories to which they belong:

$$lsim(m_1, m_2) = ns(m_1, m_2) \times \max_{c_1 \in C_1, c_2 \in C_2} ns(c_1, c_2)$$

where $C_1$ and $C_2$ are the sets of categories to which $m_1$ and $m_2$ belong, respectively.

The result of this phase is a table of linguistic similarity coefficients between elements in the two schemas. The similarity is assumed to be zero for schema elements that do not belong to any compatible categories.

Models

The invention thus matches one data model with another data model, calculating inherent similarity coefficients and structural coefficients, with an emphasis upon similarity of subtree structure. For purposes of construing what is meant by data model, or schema, in accordance with the invention, the following description of data models is presented. One of ordinary skill in the art will be able to appreciate that a wide variety of models are contemplated and that any hierarchically organized data that may form a tree structure is suited to the invention's application. How to model particular features common to a variety of particular data models in a generic sense is also described. For instance, the modeling of referential integrity constraints is described in detail to show how some particular data models operate, and how they may be generalized for purposes of applying the matching operations of the invention.

A model is a complex structure that describes a design artifact. For example, a relational schema is a model that describes a relational database, i.e., tables, columns, constraints, etc. An XML DTD or an XML schema expressed in XML Schema Definition Language (XSD) or an XDR Schema is a model that describes the structure of an XML document. An object hierarchy is a model that describes the classes, relationships and inheritances of the C++ interfaces in an application or in an object store. Further examples of models are UML descriptions, workflow definitions, Web-site maps, and other models mentioned herein.

In exemplary non-limiting embodiments of the present invention, an object-oriented data model is used to describe models and mappings. Graph-oriented terminology is sometimes used to describe models, such as when referring to objects as nodes and relationships as edges. Each relationship of a model is either a containment or non-containment relationship, and is directed from its origin object to its destination object. A model is identified by a root object and includes all objects that are reachable from the root by following containment relationships in the origin-to-destination, i.e., the container-to-containee direction.

A mapping is a model that relates a domain model to a range model, or a source model to a target model. The root of the mapping connects the root of the domain model to the root of the range model. Every other mapping object in the mapping has relationships to zero or more domain objects and relationships to zero or more range objects. A mapping may also contain an expression that explains the relationship between the domain and range objects to which it connects.

The match operation on models and mappings is as follows: Match ($M_1$, $M_2$, ≅) returns a mapping from model $M_1$ to $M_2$ that is consistent with the similarity relation ≅, which is a binary relation defined over individual objects. Although the relation ≅ is shown here as a parameter, it is currently implemented as a combination of context, e.g., a shared thesaurus, and algorithms which may be optionally plugged into a match implementation, as described by the foregoing implementations.

In accordance with the present invention, a generic object model is defined, which standardizes the comparison of disparately formatted models. As described in more detail below, any format may be represented with the generic object model, and thus the input format of a hierarchically represented data structure becomes irrelevant to the extent it may be represented with the generic object model.

Figure 7:
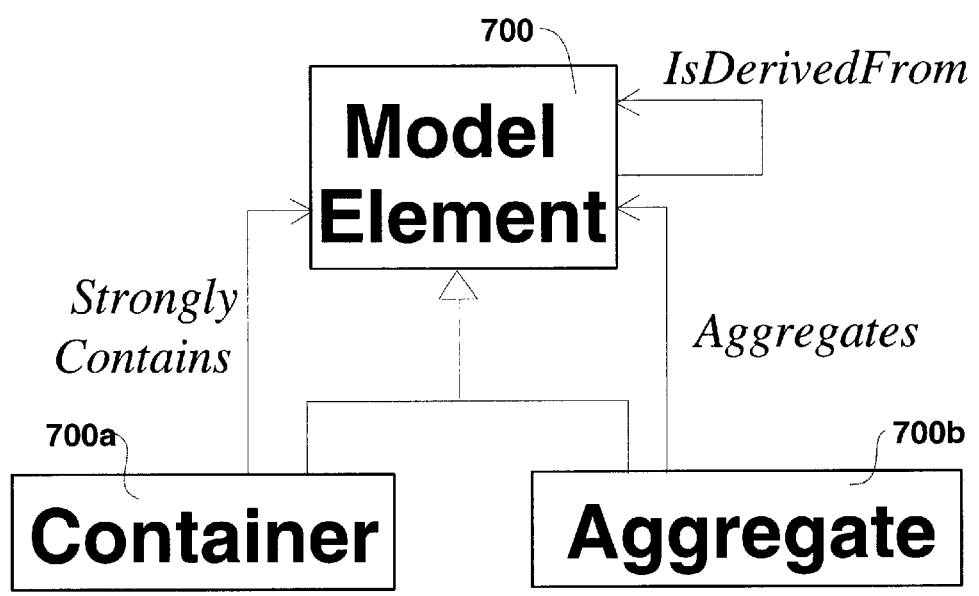
FIG. 7 is a block diagram illustrating exemplary relationships among model elements in accordance with a generically defined object model of the invention.

For the generic object model, the smallest unit of metadata is termed a model element. Distinguishing the different types of relationships between model elements is a key aspect of designing the generic object model. At least three relationships are common to a wide variety of data models, and these relationships are depicted in FIG. 7 as between model elements 700, containers 700a and aggregates 700b.

The Strongly Contains relationship relates a model element, called a container 700a to another model element 700. Each model element is strongly contained by at most one container 700a. The concept of container 700a is sufficiently useful that in one embodiment, a container is defined as a class, which is a specialization of model element 700. A Strong Containment relationship captures the following two kinds of semantics: delete propagation and naming. With delete propagation, if a container 700a is deleted, then all of the model elements 700 it contains are deleted. With naming, a model element 700 can be named by concatenating the name of its container 700a, a delimiter, e.g., "." or "/", and the name of the model element 700.

For example, if a relational schema Customers strongly contains a table Customer, which strongly contains a column CName, then the column's full name may be Customers.Customer.CName, which uniquely distinguishes it from any other column. The column ceases to exist if either the table or the schema that contains it is deleted.

The Aggregates relationship connects a model element, called an aggregate 700b, to other model elements 700. Like Strong Containment, this relationship groups together a set of related model elements 700. However, the relationship is weaker than Strong Containment, in that it does not propagate delete or affect naming. Rather, the aggregates relationship captures the semantics of prevent delete, i.e the target of an aggregation relationship cannot be deleted. In other words, the aggregation relationship must be deleted before the target can be deleted. For example, a typical aggregation relationship is the relationship from a compound key to each of the columns that comprise the key.

The IsDerivedFrom relationship connects two model elements 700. The IsDerivedFrom relationship is a generalization of isA and isTypeOf relationships, which are used in all object-modeling methodologies. The IsDerivedFrom relationship captures two kinds of semantics: delete prevention and shortcutting. With shortcutting, the target can be replaced by the source. For example, a specialization can be replaced by its generalization, or an object can be replaced by its type definition. These shortcutting semantics of IsDerivedFrom are not commonly used in object modeling; however, shortcutting semantics can be important for model match. Examples of IsDerivedFrom relationships are ones between an element and its ElementType or an attribute and its AttributeType in XDR schemas.

In other embodiments of the invention, model elements can be related by other types of relationships. StronglyContains and IsDerivedFrom relationships are both containment relationships. Thus, a model is defined by a root and contains objects reachable by following Strong Containment and IsDerivedFrom relationships.

The present invention distinguishes between model elements that are instantiated as data instances, such as elements and attributes in XDR and tables and columns in SQL, from those that are constraints on instances of other model elements, such as attribute type definitions in XDR and key definitions in SQL. The model element property IsInstantiated is true for the former, false for the latter. This distinction can be useful when performing structural matching of models.

The present invention assumes that the containment relationships that connect the objects in a model form a directed acyclic graph (DAG). Disallowing cycles implies that recursive types such as bill-of-materials and organization charts cannot be represented. There can thus be multiple paths from the root of a model to a particular model element; however, this leads to a significant complexity in matching: Suppose model D is the domain of a mapping. Suppose D contains a model element d, which has two parents via Strong Containment and/or IsDerivedFrom relationships. Since d may have two different meanings, one for each of its parents, it could be mapped to two different elements of a range model, one for each parent. This implies that a model match algorithm needs to perform context-dependent bookkeeping for each model element.

Figure 8:
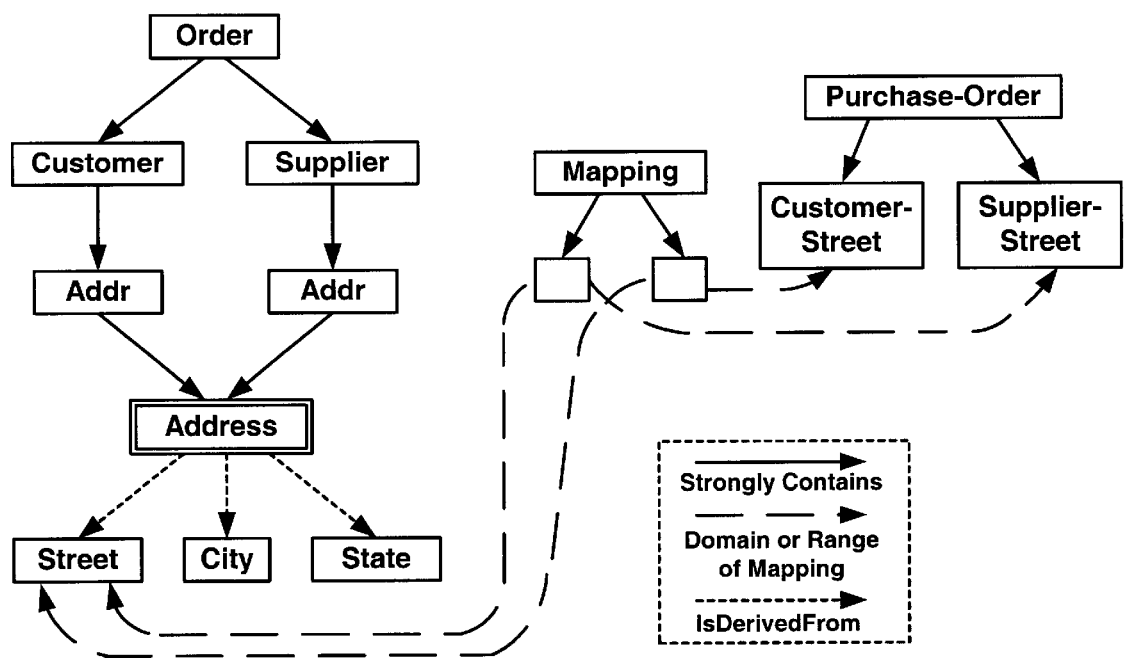
FIG. 8 illustrates exemplary handling of multiple paths from the root of a model to a particular model element in accordance with the invention.

To make this more concrete, the use of types in a schema expressed in XSD may be considered. Suppose a model that represents an XSD complexType Order has elements Customer and Supplier, as shown in FIG. 8. Suppose Addr, i.e., address, is a sub-element of both Customer and Supplier. In XSD, these are represented as two separate Addr elements as shown. In addition, suppose both Addr elements are of the same complexType, e.g., Address. In XSD, Address is represented only once and is referenced by the type attribute (shown with a double box) of the two Addr elements. Thus, when representing all of these components of Order in the generic object model utilized with the invention to genericize disparate object models, complextype Address has two parents, namely, the two Addr elements via IsDerivedFrom relationships.

Suppose complexType Address has some XSD attributes, such as Street, City, and State. These attribute definitions explain two different parts of Order, namely the substructure of Addr in Customer and of Addr in Supplier. Therefore, when creating a mapping from Order to another model, e.g., Purchase-Order, the attributes of Addr in Customer might map to different model elements in Purchase-Order than the attributes of Addr in Supplier. For example, Order.Customer.Addr.Street might map to Purchase-Order.Customer-Street and Order.Supplier.Addr.Street might map to Purchase-Order.SupplierStreet. Unfortunately, since the model element representing attribute Address.Street is shared by Customer.Street and Supplier.Street, if Address.Street is simply mapped to Purchase-Order.CustomerStreet and Purchase-Order.SupplierStreet, an ambiguity results. Namely, it is ambiguous that the relationship Address.Street to Purchase-Order.CustomerStreet is in the context of Customer while the relationship Address.Street to Purchase-Order.SupplierStreet is in the context of Supplier.

To avoid the context-dependent bookkeeping implied by this example, the generic object model of the invention considers each path to a node with multiple parents independently. Each such path is a data-path. During the execution of a match operation, all data-paths are expanded, thereby effectively transforming the DAG into a tree. As a side note, while the use of the word data-path comes from the intuition that it is a sequence of "data" containment relationships, a better term might be "name-path" or "ID-path."

The schemas that have been examined herein so far have been trees. Real world schemas are rarely trees, since they share substructure and have referential constraints. The techniques of the present invention may be extended to these cases, but first a generic schema model that captures more semantics is presented, leading to nontree schemas.

In a generic schema model, a schema is a rooted graph whose nodes are elements. The invention uses the terms nodes and elements interchangeably. In a relational schema, the elements are tables, columns, user defined types, keys, etc. In an XML schema the elements are XML elements and attributes (and simpleTypes, complex Types, and keys/keyrefs in XML Schema (XSD)). Elements are interconnected by three types of relationships, which together lead to nontree schema graphs. The first is containment, which models physical containment in the sense that each element (except the root) is contained by exactly one other element. For example, a table contains its columns, and is contained by its relational schema. An XML attribute is contained by an XML element. The schema trees presented in examples so far are essentially containment hierarchies. A second type of relationship is aggregation. Like containment, aggregation groups elements, but is weaker (allows multiple parents and has no delete propagation). For instance, a compound key aggregates columns of a table. Thus, a schema graph need not be a tree, i.e., a column can have two parents: a table and a compound key. The third type of relationship is IsDerivedFrom, which abstracts IsA and IsTypeOf relationships to model shared type information. Schemas that use them can be arbitrary graphs (e.g., cycles due to recursive types). In XSD, an IsDerivedFrom relationship connects an XML element to its complex type. In object oriented models, IsDerivedFrom connects a subtype to its supertype. IsDerivedFrom shortcuts containment: if an element e IsDerivedFrom a type t, then t's members are implicitly members of e. For example, if USAddress specializes Address, then an element Street contained by Address is implicitly contained by USAddress too.

With respect to matching shared types, when matching schemas are expressed in the above model, the linguistic matching process that was described earlier is unaffected. The invention may, however, choose not to linguistically match certain elements, e.g., those with no significant name, such as keys. Structure matching is affected. Before this step, the schema is converted to a tree, for two reasons: to reuse the structure matching algorithm for schema trees and to cope with context dependent mappings. An element, such as a shared type, can be the target of many IsDerivedFrom relationships. Such an element e might map to different elements relative to each of e's parents. For example, reconsidering the XML schemas in FIG. 3, suppose the PurchaseOrder schema was altered so that Address is a shared element, referenced by both DeliverTo and InvoiceTo. POShipTo.Street and POBillTo.Street now both map to Address.Street in Purchase Order, but for each of them the mapping needs to qualify Address.Street to be in the context of either DeliverTo or InvoiceTo. Including both of the mappings without their contexts is ambiguous, e.g., complicating query discovery. Thus, context dependent mappings are needed. The invention achieves this by expanding the schema into a schema tree. There can be many paths of IsDerivedFrom and containment relationships from the root of a schema to an element e. Each path defines a context, and thus is a candidate for a different mapping for e. By converting a schema to a tree, the invention materializes all such paths. To accomplish this, the algorithm performs a preorder traversal of the schema, creating a private copy of the subschema rooted at the target t of each IsDerivedFrom for each of t's parents, which is essentially type substitution. In an exemplary embodiment, the algorithm is as follows:

```
schema_tree = construct_schema_tree(schema.root, NULL)
construct_schema_tree(Schema Element current_se,
Schema Tree Node current_stn)
    If current_se is the root or current_se was
    reached through a containment relationship
        If current_se is not_instantiated then return current_stn
        new_stn = new schema tree node corresponding to current_se
        set new_stn as a child of current_stn
        current_stn = new_stn
    for each outgoing containment or isDerivedFrom relation
        new_se = schema element that is the target of the relationship
        construct_schema_tree(new_se, current_stn)
    return current_stn
```

For each element, the invention adds a schema tree node whose successors are the nodes corresponding to elements reachable via any number of IsDerivedFrom relationships followed by a single containment. Some elements are tagged not-instantiated (e.g., keys) during the schema tree construction and are ignored during this process.

At this point, a representation has been formed on which the invention may run the tree match algorithm described in detail above. The similarities computed are now in terms of schema tree nodes. The resulting output mappings identify similar elements, qualified by contexts. This results in more expressive and less ambiguous mappings.

Thus, Strong Containment, IsDerivedFrom, and aggregate relationships can be used to model hierarchical schemas, such as XML schemas without any IDs and IDREFs, or a SQL schema without any foreign keys. This alone, however, places a restriction on the expressive power of a model. In order to alleviate this restriction, a fourth relationship may be introduced, termed a referential integrity relationship or referential integrity constraint in the database literature. A referential integrity relationship models an existential dependency between model elements in different parts of a schema. A model element that represents a referential integrity constraint is called a RefInt. Referential integrity constraints are supported in most data models.

Three examples of referential integrity relationships include the relationship between a foreign key column in a table and the primary key in another table, the relationship between an ID and an IDREF in a DTD and the relationship between a keyref and a key in XSD. Referential constraints are directed from a source, e.g., foreign key column, to a target, e.g., primary key to which the foreign key refers. Such RefInt elements aggregate the source, and reference the target of such a relationship, whereby "reference" is a new relationship type.

Figure 9A:
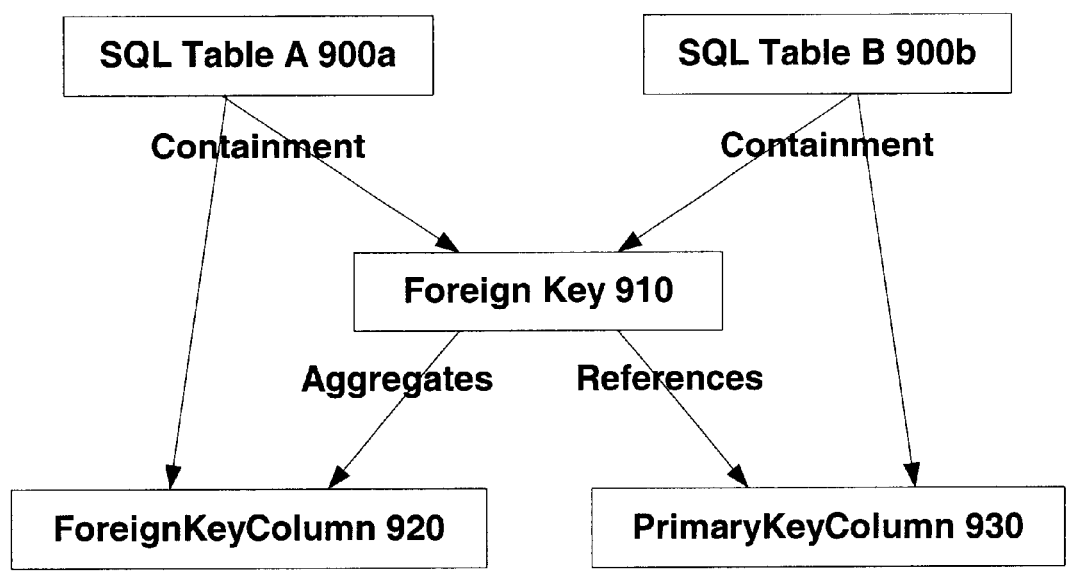
FIG. 9A illustrates exemplary modeling of a foreign key with respect to two SQL tables in accordance with the present invention.

Both the aggregates and reference relationships are one to n. Thus, a RefInt can model compound keys and multi-attribute keyrefs. For example, the modeling of a foreign key 910 with respect to two SQL Tables 900a and 900b, foreign key column 920 and primary key column 930 is shown in FIG. 9A. Referential integrity relationships are directed. In the case of SQL schemas, the foreign key column 920 is the source, and the primary key column 930 by which it is constrained is the target. The source and the target can in general be sets of model elements, e.g., a compound key. The foreign key references the single compound primary key elements 930 of the target table, which aggregates the key columns 920 of that table.

In the general case, there is a single reference relationship. Multiple references allow for alternate targets for a single source of a referential constraint, e.g., an IDREF attribute in XDR references all the ID attributes in the schema, because each of them is a candidate target for an IDREF attribute (IDs and IDREFs are untyped in DTDs and XDR schemas). The 1 to n nature of the reference relationship thus allows a single IDREF attribute to reference multiple IDs in an XML DTD.

Figure 9B:
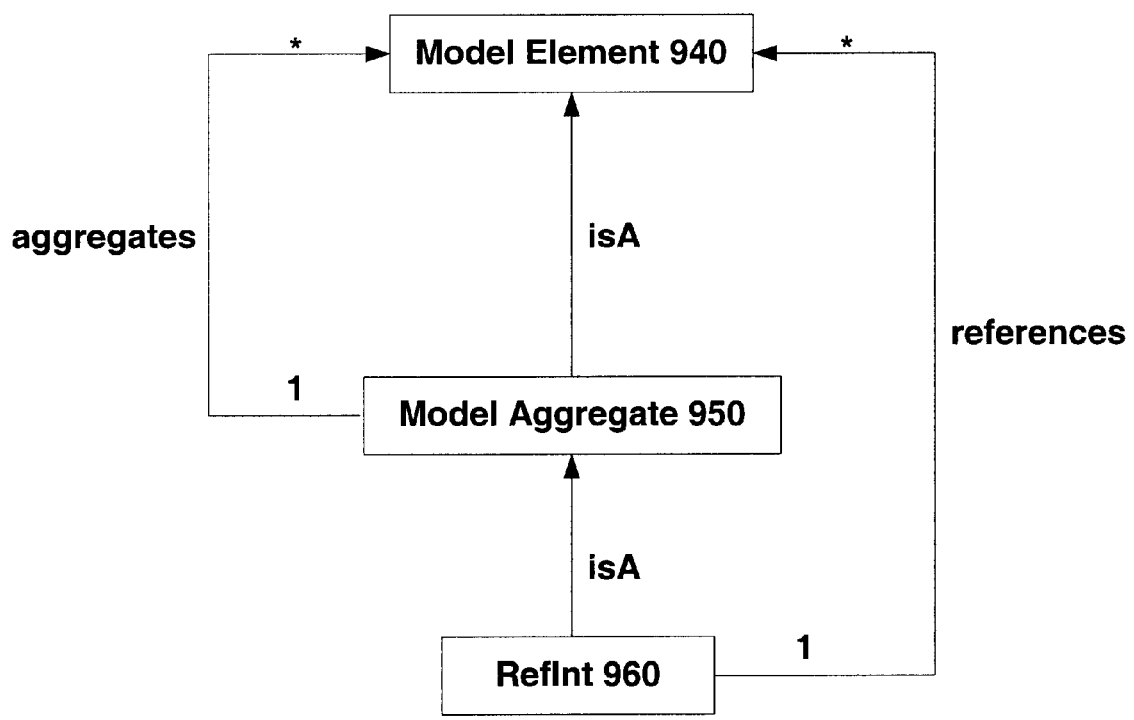
FIG. 9B illustrates an exemplary RefInt model element that represents a referential integrity constraint in accordance with the invention.

FIG. 9B illustrates the relationship between a model element 940, a model aggregate 950 and a RefInt 960. In this regard, a RefInt 960 is a specialization of a model aggregate 950, which is a specialization of a model element 940. In addition to the aggregate relationship that is inherited, a RefInt 960 also has a reference relationship. A RefInt 960 aggregates the model elements that are the source and references the target of the referential constraint.

Figure 10A:
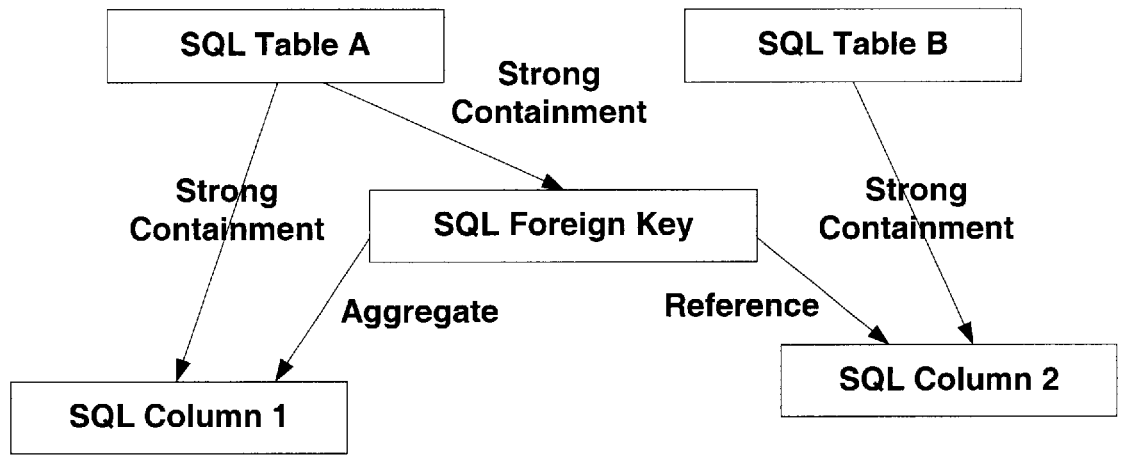
FIG. 10A illustrates an exemplary model representation of a RefInt in a relational schema in accordance with the invention.
Figure 10B:
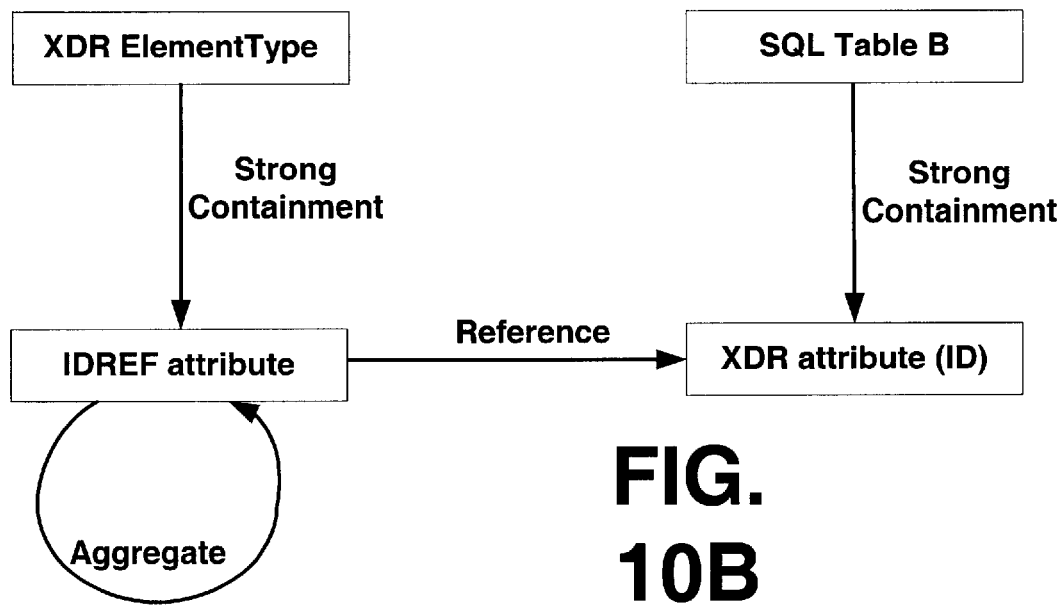
FIG. 10B illustrates an exemplary model representation of a RefInt in an external Data Representation (XDR) schema in accordance with a non-limiting exemplary embodiment of the invention.

A RefInt model element can either be instantiated (e.g., IDREFs) or not instantiated (e.g., foreign keys), as indicated by an isInstantiated flag. The model representation of RefInts in relational and XDR schemas is shown in FIGS. 10A and 10B, respectively.

Utilizing this knowledge of RefInts, a data path tree may be augmented with additional nodes, where useful. More particularly, a data path tree that is built by exploiting Strong Containment and IsDerivedFrom relationships may be augmented with additional nodes to take advantage of RefInts in the similarity computation.

In this regard, foreign keys are taken advantage of by interpreting them as join views. The foreign key node in the schema is replaced by a single data path node representing the join of the two tables. There are two motivations for such an abstraction. The first is that a referential constraint says that a join between two tables makes semantic sense, because values of the foreign key are guaranteed to be present as values of the key being referenced. The second is that since the match algorithm operates by matching data tree elements, representing a referential constraint as such a node makes it the subject of a match. The interpretation of a RefInt as a join view is illustrated in the example below.

Figure 11:
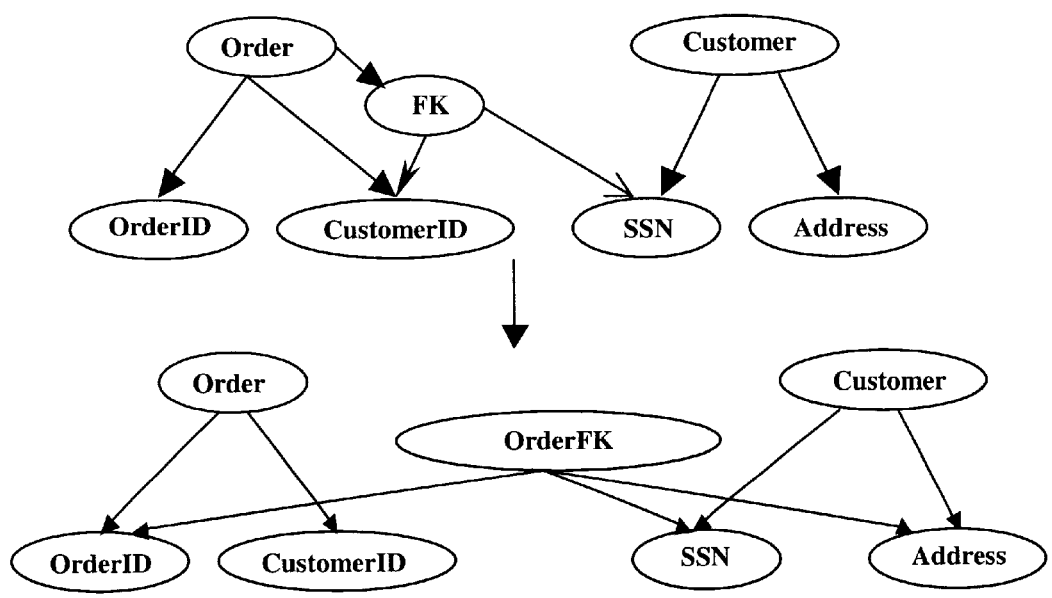
FIG. 11 illustrates exemplary encoding of a RefInt in a data tree for an SQL schema in accordance with the invention.

For the sake of clarity, FIG. 11 illustrates encoding a RefInt in a data tree for SQL schemas. A similar procedure is applicable in XSD and XDR schemas. An additional node is added that has as its children the columns of the two tables, with one exception: the foreign key columns are not duplicated, since they are the same in both tables (the choice of primary or foreign key columns is arbitrary). As a result of this augmentation, a data path DAG is formed instead of a tree, because the referenced model elements have two parents, e.g., OrderID, CustomerID, SSN, and Address in FIG. 11. The augmented node is a child of the schema node of the data path DAG (e.g., OrderFK in FIG. 11, although the schema node is not shown in that figure). Since it is possible to enumerate the nodes of a DAG in inverse topological order, the tree comparison algorithm described earlier is applicable to this DAG as well. However, the algorithm loses its Church-Rosser property. That is, the result of the similarity computation might vary depending upon the order in which the table and view nodes are considered, since there doesn't exist a unique inverse topological order enumeration.

Figure 12:
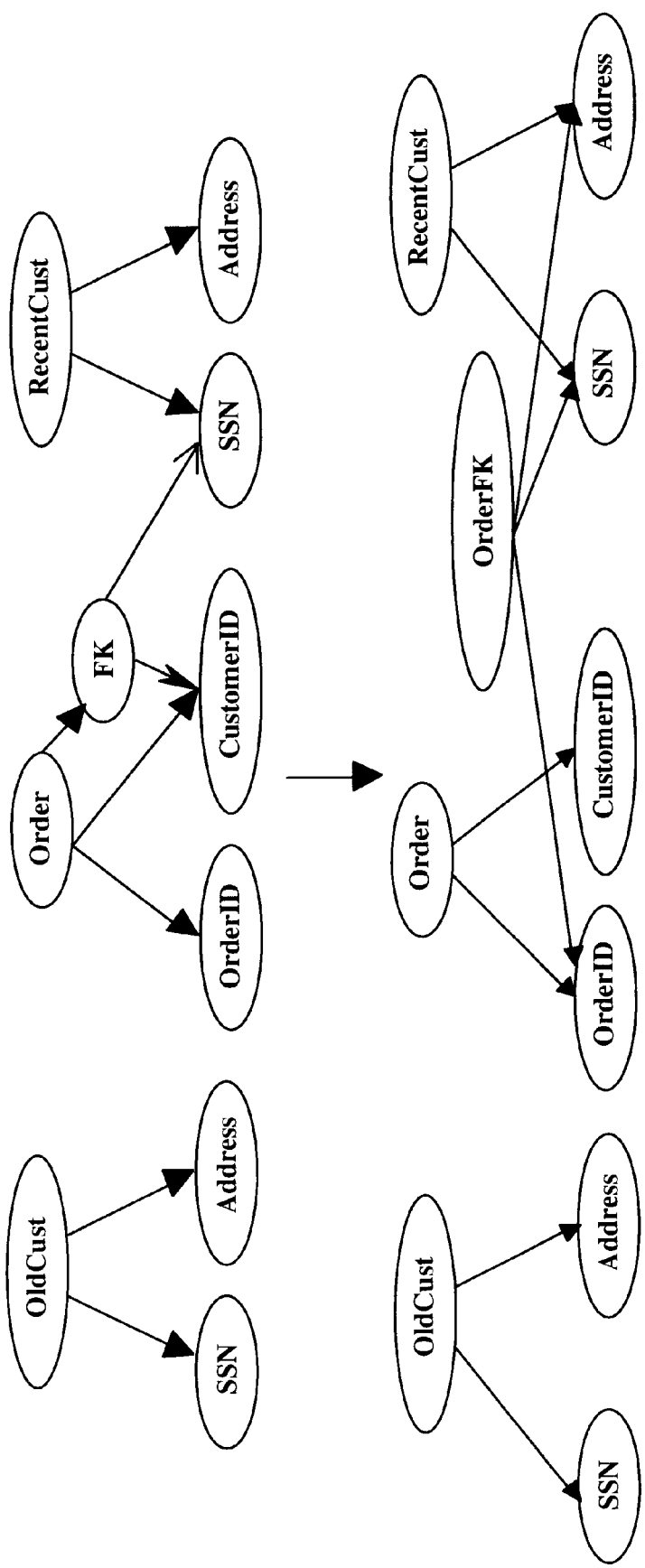
FIG. 12 illustrates exemplary disambiguation of matchings between elements that are referenced by a RefInt in accordance with the invention.

This encoding of a RefInt not only causes foreign keys to be matched between two models, but also disambiguates matchings between elements that are referenced by the RefInt. For example, suppose the model of FIG. 11 is being matched with the model of FIG. 12. In FIG. 12, only recent customers (RecentCust) have orders. Old customers (OldCust) are customers who have not placed orders in a long time. Therefore, the foreign key is from CustomerID in Order to RecentCust and not to OldCust. When matching this model against FIG. 11, the nodes named OrderFK in the two models will be compared for similarity and will be found to match, based both on their linguistic similarity and structural similarity. This match will cause the leaves of the trees rooted at OrderFK in the two models to be reinforced as per the step of the matching algorithm that reinforces similar (and dissimilar) leaf structure of nodes, so that the subtree Customer in FIG. 11 will match RecentCust in FIG. 12 rather than OldCust.

This example also illustrates the loss of the Church-Rosser property: The argument of the previous paragraph holds only if the similarity of the OrderFK elements of the two models is calculated before that of Customer and RecentCust. If the latter is calculated first, then the similarity of Customer to RecentCust will be the same for Customer and OldCust. This suggests that elements representing foreign keys should be matched before those that represent the (base) elements that those foreign keys connect. It also shows that a second pass calculation of similarities of non-leaf elements would produce more accurate results.

The presence of multiple foreign keys, some of which might be compound keys, in a single table presents a combinatorial challenge. Strictly speaking, each conceivable combination of keys presents an alternative view definition, and hence an additional data path node. However, in the interest of preventing a combinatorial blow-up, one additional node per foreign key is added to a table.

Another consideration is the cascading of view expansions. The additional node resulting from one join view might contain a column that is a foreign key to a different table. In accordance with the invention, such nodes are not expanded any further, in the interest of keeping the computation manageable.

A similar procedure is applicable in the case of ID/IDREF pairs in XDR schemas, with the following changes: First, since each IDREF attribute references every ID attribute in the schema, an extra node is added for each ID/IDREF attribute pair in the schema. Second, while all the children of a SQL table are leaves of the data path DAG, the same is not true for XML elements in an XML schema. Furthermore, a cycle could appear if an IDREF attribute references an ID attribute higher up in the schema. Cycles must be prevented to avoid an infinite loop in the algorithm for constructing data path trees. Cycles can be prevented by performing cycle detection during augmentation and then links are not added that result in cycle formation. It is noted that these are cycles in the data path tree, which are different from the cycles of contained and IsDerivedFrom relationships. Third, as there can be multiple ID (IDREF) attributes corresponding to a single Attribute Type in XDR, each such attribute contributes to additional nodes in the data path tree.

The approach to XSD includes the following considerations: First, keys and keyrefs in XSD are typed and context-sensitive, qualified by Xpath expressions, and not context-free like ID/IDREFs. Only those nodes that match the Xpath expressions need to be considered during augmentation. Second, keys and keyrefs can have multiple attributes, but unlike compound foreign keys, these attributes need not be contained by a single parent. This leads to a need for careful consideration of nodes to be assigned as children of the augmented node.

Figure 13:
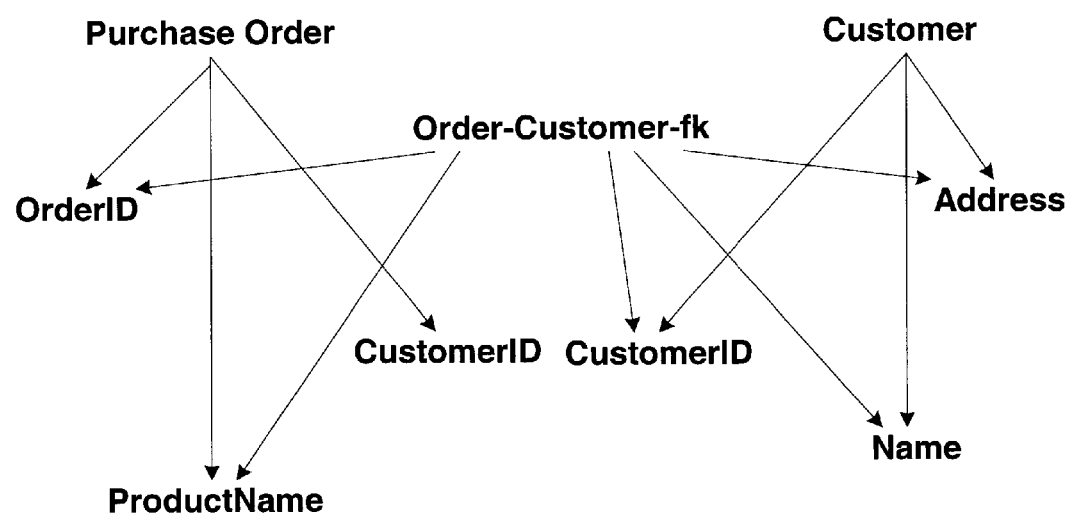
FIG. 13 illustrates exemplary introduction of a node in response to encountering a referential constraint, such as a foreign key, in a schema in accordance with the present invention.

Thus, as mentioned, the present invention interprets referential constraints as potential join views. In one embodiment, for each foreign key, the present invention introduces a node that represents the join of the participating tables, illustrated in more detail in FIG. 13. This technique reifies the referential constraint as a node that can be matched. Intuitively, the technique works since the referential constraint implies that the join is meaningful. It is of note that the join view node has as its children the columns from both the tables. The common ancestor of the two tables is thus made the parent of the new join view node.

These augmented nodes have two benefits. First, if two pairs of tables in the two schemas are related by similar referential constraints, then when the join views for the constraints are matched, the structural similarities of those tables' columns are increased. This improves the structural match. Second, this enables the discovery of mappings between a join view in one schema and, a single table or other join views in the second schema. The additional join view nodes create a directed acyclic graph (DAG) of schema paths. Since the inverse topological ordering of a DAG, equivalent to post-order for a tree, is not unique, the algorithm is not Church-Rosser, i.e., the final similarities depend on the order in which nodes are compared. To make it Church-Rosser, additional ordering constraints may be added. For example, the RefInt nodes may be compared after the table nodes; however, determining which ordering would be best is still an open problem. If a table has multiple foreign keys, one node may be added for each of them. There is also the option of adding a node for each combination of these foreign keys (valid join views). In the interest of maintaining tractability, however, this step may be skipped. Similarly, the join view node that is added may also have a foreign key column of the target table. The invention may also expand these further, thus escalating expansion of referential constraints, but both for computation reasons and due to the lower relevance of tables at further distances, such a technique may be foregone.

In one embodiment of the invention, a feature of optionality is provided. Elements of schemas may be marked as optional, i.e., as nonrequired attributes of XML elements. To exploit this knowledge, the leaves reachable from a schema tree node n are divided into two classes: optional and required. A leaf is optional if it has at least one optional node on each path from n to the leaf. The structural similarity coefficient expression is changed to reduce the weight of optional leaves that have no strong links, i.e., they are not considered in both the numerator and denominator of the ssim calculation. Therefore, nodes are penalized less for unmappable optional leaves than unmappable required leaves, so the matching is more tolerant to the former.

In another embodiment of the invention, different views are accommodated. View definitions are treated like referential constraints. A schema tree node is added whose children are the elements specified in the view. Such a schema tree node represents a common context for these elements and can be matched with views or tables of the other schema.

In another embodiment of the invention, a lazy expansion process is provided. A schema tree construction expands elements into each possible context, much like type substitution. This expansion duplicates elements, leading to repeated comparisons of identical subtrees. For example, in the example provided in FIG. 3, the Address element is duplicated in multiple contexts within the PurchaseOrder schema and each of these duplicates is compared separately to elements of PO. These duplicate comparisons may be avoided by a lazy schema tree expansion, which compares elements of the schema graph before converting it to a tree. The elements are enumerated in inverse topological order of containment and IsDerivedFrom relationships. After comparing an element that is the target t of multiple IsDerivedFrom and containment relationships, multiple copies of the subtree rooted at t are made, including the structural similarities computed so far. This works because when two nodes are compared for the first time, their similarity depends on the similarity of their subtrees. Similarly, the similarity of the leaves reflect those nodes that have already been traversed thus far. Hence, the computed similarity values remain the same as in the case when the schema is expanded a priori. Thus, identical recomputation for the context dependent copies of the subtree may be avoided.

The analyses of the matching problem and the provision of a generic solution, as described herein, leads to a variety of observations. For instance, with respect to granularity of similarity computation, it has been observed that class-level similarity computation can sometimes lead to nonoptimal mappings. Thus, with the invention, single classes may be nested or normalized differently, with referential constraints, in different schemas.

Using the leaves in the schema tree for the structural similarity computation allows the invention approach to match similar schemas that have different nesting. Also, reporting mappings in terms of leaves allows a sophisticated query discovery module to generate the correct queries for data transformations.

Moreover, incorporating structure information beyond the immediate vicinity of a schema element leads to better matching. Thus, in the example of FIG. 3, the invention is able to match POBillTo, POShipTo and POLines to InvoiceTo, DeliverTo and Items respectively.

Furthermore, context-dependent mappings generated by constructing schema trees are useful when inferring different mappings for the same element in different contexts.

Some of the mapping results for a certain tool or application might not be the best achievable by the algorithm since improvements may be possible by adjusting a few of the parameters. Tuning performance parameters in some cases requires expert knowledge of these tools. Thus, in an exemplary embodiment, a module for autotuning parameters is provided. Based upon the analysis of volumes of data, taking the complexity of the structure and linguistics of the schemas into account, a mechanism can be provided for automatically setting the parameters of the invention prior to matching. Alternatively, a "sliding bar" of results may be presented to the user, giving the user an opportunity at a glance to choose results from a variety of parameter sets.

As mentioned above, while exemplary embodiments of the present invention have been described in connection with various computing devices and network architectures, the underlying concepts may be applied to any computing device or system in which it is desirable to match models. Thus, the techniques for calculating similarity coefficients and a mapping between models in accordance with the present invention may be applied to a variety of applications and devices. For instance, the model matching techniques of the invention may be applied to the operating system of a computing device, provided as a separate object on the device, as part of the object itself, as a downloadable object from a server, as a "middle man" between a device or object and the network, etc. The similarity coefficients and mapping data generated may be stored for later use, or output to another independent, dependent or related process or service. While exemplary programming languages, names and examples are chosen herein as representative of various choices, these languages, names and examples are not intended to be limiting. One of ordinary skill in the art will recognize that such languages, names and examples it are choices that may vary depending upon which type system is implicated, and the rules for the type system. Further, while particular names for software components are utilized herein for distinguishing purposes, any name would be suitable and the present invention does not lie in the particular nomenclature utilized.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the model matching of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the matching capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of a loosely coupled peer to peer network, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Moreover, it is to be understood that the model matching algorithm(s) of the various embodiments described herein are generically applicable, independent of any particular data model. Accordingly, it is to be understood that while various examples herein are described in the context of a particular format, such as SQL, XML, UML, DTD, XSD, XDR and the like, this is for illustrative purposes only, and the techniques of the invention can be applied not only to any schema format now known, but also to any hereafter-developed data format. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for generating similarity coefficients between model elements when comparing a first data model having hierarchically organized first model elements and a second data model having hierarchically organized second model elements, comprising:

first generating a plurality of inherent similarity coefficients for each pair of model elements, with each pair comprising a model element of said first model elements and a model element of said second model elements;

second generating a plurality of structural similarity coefficients for each pair of model elements based on a similarity of subtree elements rooted by the element pair, whereby each pair of model elements is assigned an initial structural similarity coefficient;

third generating a plurality of weighted similarity coefficients for each pair of model elements as a weighted function of said plurality of inherent similarity coefficients and said plurality of structural similarity coefficients; and for each pair of model elements, altering the similarity of said subtree elements rooted by the element pair if a function based on said weighted similarity coefficient of said element pair meets a predetermined condition.

2. A method according to claim 1, wherein said similarity of subtree elements includes similarity of pairs of subtree elements, with each pair of subtree elements comprising a model element of said first model elements and a model element of said second model elements.

3. A method according to claim 1, wherein said second generating includes second generating a plurality of structural similarity coefficients for each pair of model elements based on a similarity of leaves rooted by the element pair.

4. A method according to claim 1, whereby in connection with said second generating, said pairs of model elements are initially assigned structural similarity coefficients based on a constant.

5. A method according to claim 1, whereby in connection with said second generating, said pairs of model elements are initially assigned structural similarity coefficients based on data type compatibility.

6. A method according to claim 1, whereby in connection with said second generating, only pairs of leaves are initially assigned structural similarity coefficients.

7. A method according to claim 1, wherein for each pair of model elements, the similarity for said subtree elements rooted by the element pair is increased by a predetermined amount if said weighted similarity coefficient of said element pair exceeds a predefined, variable threshold.

8. A method according to claim 1, wherein for each pair of model elements, the similarity for said subtree elements rooted by the element pair is decreased by a predetermined amount if said weighted similarity coefficient of said element pair is less than a predefined, variable threshold.

9. A method according to claim 1, wherein said first generating includes first generating a plurality of linguistic similarity coefficients for each pair of model elements and said third generating includes third generating a plurality of weighted similarity coefficients for each pair of model elements as a weighted function of said plurality of linguistic similarity coefficients and said plurality of structural similarity coefficients.

10. A method according to claim 9, wherein said first generating includes first generating a plurality of linguistic similarity coefficients for each pair based on per type similarities of tokens of the model elements.

11. A method according to claim 10, wherein token types include numbers, special symbols, common words, concepts and content.

12. A method according to claim 9, wherein said first generating includes analysis of at least one of (a) at least one dictionary and (b) at least one thesaurus.

13. A method according to claim 1, wherein said second and third generating are computed in inverse-topological order.

14. A method according to claim 1, wherein the weight of the weighted function is a variable parameter.

15. A method according to claim 1, wherein said second generating is performed for only those pairs of model elements that have a comparable number of leaves within a predetermined factor.

16. A method according to claim 1, further including fourth performing said third generating again, if the similarity of subtree elements has been altered according to said altering.

17. A method according to claim 1, further including post-processing at least one of the plurality of inherent similarity coefficients, the plurality of structural similarity coefficients and the weighted similarity coefficients to construct a mapping between the first and second models.

18. A method according to claim 1, further including receiving data from a user about matching the first and second models that is used in connection with initializing the initial structural similarity coefficients.

19. A method according to claim 1, further including transforming said first and second data models into a generic object model format upon which said first, second and third generating operate irrespective of the input format of the first and second data models before such transformation.

20. A method according to claim 1, wherein said first, second and third generating are performed in real-time.

21. A method according to claim 1, wherein further including transforming said first and second models to first and second trees of data paths, respectively.

22. A computer readable medium having stored thereon a plurality of computer-executable instructions for performing the method of claim 1.

23. A modulated data signal carrying computer executable instructions for performing the method of claim 1.

24. A computing device comprising means for performing the method of claim 1.

25. A computer readable medium having stored thereon a plurality of computer-executable modules, the computer executable modules, comprising:
a comparison mechanism for generating similarity coefficients between model elements when comparing a first data model having hierarchically organized first model elements and a second data model having hierarchically organized second model elements, said mechanism comprising:
means for first generating a plurality of inherent similarity coefficients for each pair of model elements, with each pair comprising a model element of said first model elements and a model element of said second model elements;

means for second generating a plurality of structural similarity coefficients for each pair of model elements based on a similarity of subtree elements rooted by the element pair, whereby each pair of model elements is assigned an initial structural similarity coefficient;
means for third generating a plurality of weighted similarity coefficients for each pair of model elements as a weighted function of said plurality of inherent similarity coefficients and said plurality of structural similarity coefficients; and
means for altering the similarity of said subtree elements rooted by the element pair for each pair of model elements, if a function based on said weighted similarity coefficient of said element pair meets a predetermined condition.

26. A computer readable medium according to claim 25, wherein said similarity of subtree elements includes similarity of pairs of subtree elements, with each pair of subtree elements comprising a model element of said first model elements and a model element of said second model elements.

27. A computer readable medium according to claim 25, wherein said means for second generating includes means for second generating a plurality of structural similarity coefficients for each pair of model elements based on a similarity of leaves rooted by the element pair.

28. A computer readable medium according to claim 25, whereby in connection with said means for second generating, said pairs of model elements are initially assigned structural similarity coefficients based a constant.

29. A computer readable medium according to claim 25, whereby in connection with said means for second generating, said pairs of model elements are initially assigned structural similarity coefficients based on data type compatibility.

30. A computer readable medium according to claim 25, whereby in connection with said means for second generating, only pairs of leaves are initially assigned structural similarity coefficients.

31. A computer readable medium according to claim 25, wherein for each pair of model elements, the similarity for said subtree elements rooted by the element pair is increased by a predetermined amount if said weighted similarity coefficient of said element pair exceeds a predefined, variable threshold.

32. A computer readable medium according to claim 25, wherein for each pair of model elements, the similarity for said subtree elements rooted by the element pair is decreased by a predetermined amount if said weighted similarity coefficient of said element pair is less than a predefined, variable threshold.

33. A computer readable medium according to claim 25, wherein said means for first generating includes means for first generating a plurality of linguistic similarity coefficients for each pair of model elements and said means for third generating includes means for third generating a plurality of weighted similarity coefficients for each pair of model elements as a weighted function of said plurality of linguistic similarity coefficients and said plurality of structural similarity coefficients.

34. A computer readable medium according to claim 33, wherein said means for first generating includes means for first generating a plurality of linguistic similarity coefficients for each pair based on per type similarities of tokens of the model elements.

35. A computer readable medium according to claim 34, wherein token types include numbers, special symbols, common words, concepts and content.

36. A computer readable medium according to claim 33, wherein said means for first generating includes analysis of at least one of (a) at least one dictionary and (b) at least one thesaurus.

37. A computer readable medium according to claim 25, wherein said means for second and third generating compute in inverse topological order.

38. A computer readable medium according to claim 25, wherein the weight of the weighted function is a variable parameter.

39. A computer readable medium according to claim 25, wherein said means for second generating performs for only those pairs of model elements that have a comparable number of leaves within a predetermined factor.

40. A computer readable medium according to claim 25, further including means for fourth performing the generating of the means for third generating again, if the similarity of subtree elements has been altered according to said means for altering.

41. A computer readable medium according to claim 25, further including means for post-processing at least one of the plurality of inherent similarity coefficients, the plurality of structural similarity coefficients and the weighted similarity coefficients to construct a mapping between the first and second models.

42. A computer readable medium according to claim 25, further including means for receiving data from a user about matching the first and second models that is used in connection with initializing the initial structural similarity coefficients.

43. A computer readable medium according to claim 25, further including means for transforming said first and second data models into a generic object model format upon which said first, second and third generating operate irrespective of the input format of the first and second data models before such transformation.

44. A computer readable medium according to claim 25, wherein said means for first, second and third generating perform in real-time.

45. A computer readable medium according to claim 25, wherein further including means for transforming said first and second models to first and second trees of data paths, respectively.

46. A modulated data signal carrying computer executable instructions output as a result of the execution of the plurality of computer-executable instructions of the computer readable medium of claim 25.

47. A computing device comprising means for carrying out the plurality of computer-executable instructions of the computer readable medium of claim 25.

* * * * *